United States Patent [19]

Coogan et al.

[11] Patent Number: 4,747,047

[45] Date of Patent: May 24, 1988

[54] DATA TRANSFER SYSTEM USING TWO PERIPHERAL CONTROLLERS TO ACCESS DUAL-PORTED DATA STORAGE UNITS

[75] Inventors: Ronald S. Coogan, Trabuco Canyon; Toan D. Dang, El Toro, both of Calif.

[73] Assignee: Unisys Corporation, Detroit, Mich.

[21] Appl. No.: 805,649

[22] Filed: Dec. 6, 1985

[51] Int. Cl.[4] .................................... G06F 13/14
[52] U.S. Cl. .................................... 364/200
[58] Field of Search ... 364/200 MS File, 900 MS File

[56] References Cited

U.S. PATENT DOCUMENTS

| | | | |
|---|---|---|---|
| 3,408,632 | 10/1968 | Hauck | 364/200 |
| 3,593,302 | 7/1971 | Saito et al. | 364/200 |
| 3,792,448 | 2/1974 | Bennett et al. | 364/200 |
| 3,999,163 | 12/1976 | Levy et al. | 364/200 |
| 4,060,849 | 11/1977 | Bienvenu et al. | 364/200 |
| 4,074,352 | 2/1978 | Cook et al. | 364/200 |
| 4,106,092 | 8/1978 | Miller, II | 364/200 |
| 4,162,520 | 7/1979 | Cook et al. | 364/200 |
| 4,183,084 | 1/1980 | Lawson | 364/200 |
| 4,189,769 | 2/1980 | Cook et al. | 364/200 |
| 4,205,374 | 5/1980 | Bardsley, III et al. | 364/200 |
| 4,208,715 | 6/1980 | Kumahara et al. | 364/200 |
| 4,268,906 | 5/1981 | Bourke et al. | 364/200 |
| 4,280,193 | 7/1981 | Baun et al. | 364/200 |
| 4,313,162 | 1/1982 | Baun et al. | 364/200 |
| 4,390,964 | 6/1983 | Horky et al. | 364/200 |
| 4,418,382 | 11/1983 | Larson et al. | 364/200 |
| 4,476,526 | 8/1984 | Dodd | 364/200 |
| 4,484,263 | 11/1984 | Olson et al. | 364/200 |
| 4,494,194 | 1/1985 | Harris et al. | 364/200 |
| 4,509,113 | 4/1985 | Heath | 364/200 |
| 4,538,224 | 8/1985 | Peterson | 364/200 |
| 4,562,533 | 12/1985 | Hodel et al. | 364/200 |

OTHER PUBLICATIONS

"Storage Control for 3.2 Gbyte Multi-device Disk Storage", Takanami et al, Review of Electrical Communication Laboratories, vol. 30, No. 1, 1982, pp. 8-13.
"Internal Wrap Test for Microprogrammed Binary Synchronous Communication Adapter", Houdek et al, IBM Technical Disclosure Bulletin, vol. 16, No. 6, Nov. 1973, p. 1862.

Primary Examiner—Archie E. Williams, Jr.
Assistant Examiner—Danh Phung
Attorney, Agent, or Firm—Alfred W. Kozak; Nathan Cass; L. Joseph Marhoefer

[57] ABSTRACT

A data transfer network includes a group of disk drive peripheral units, each has dual ports for connection to two separate peripheral-controllers. A host computer can initiate either peripheral-controller to access selected disk drive units for Read/Write operations.

13 Claims, 14 Drawing Sheets

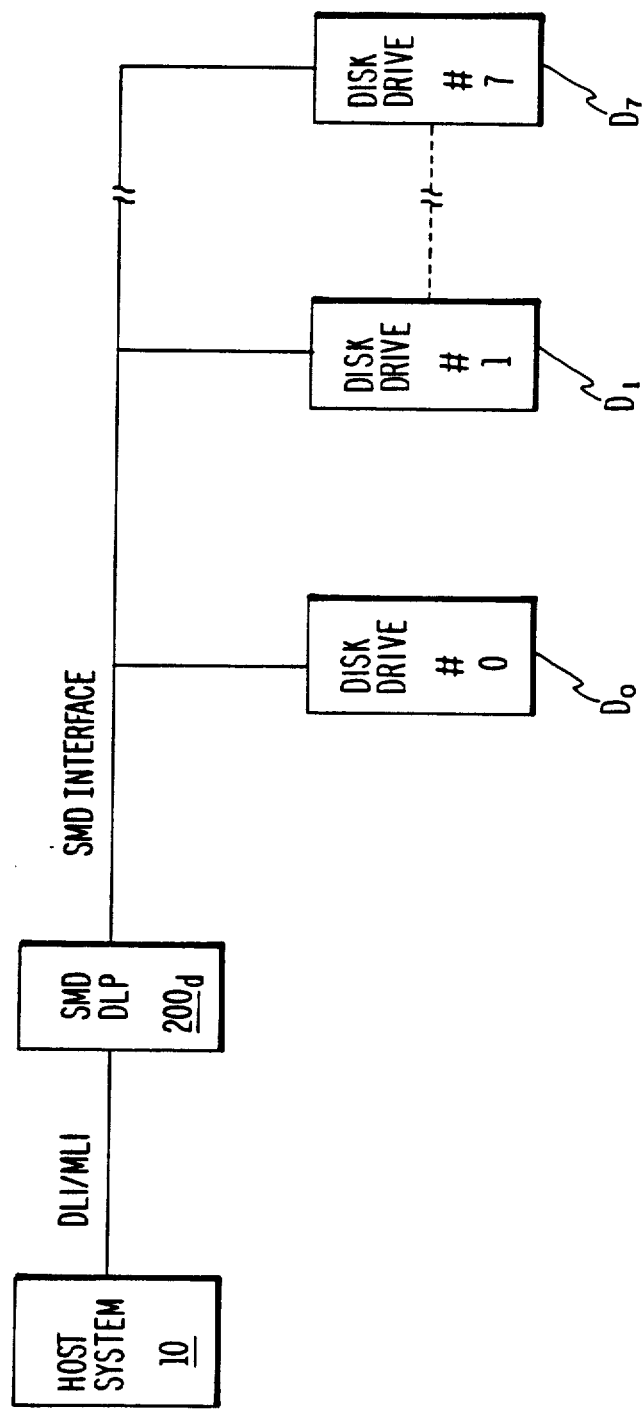
FIG.1. Typical DLP Configuration.

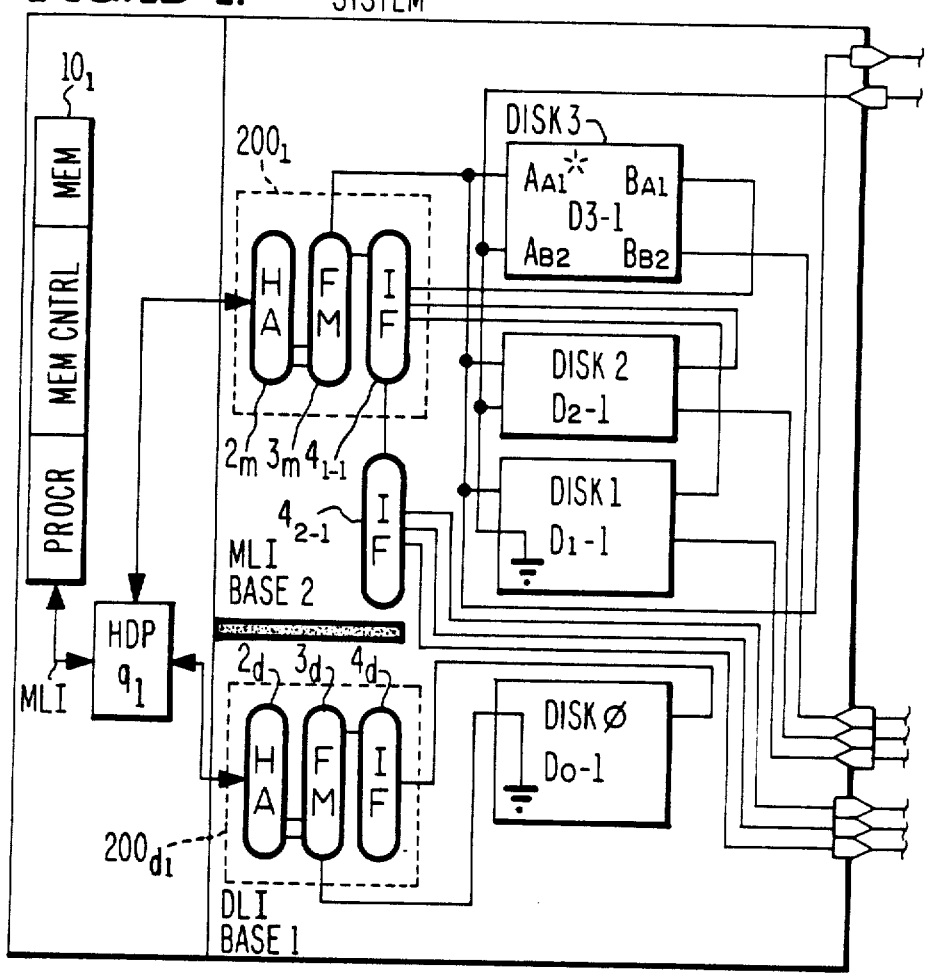
FIG.1B-1.
MLI = MESSAGE LEVEL INTERFACE
DLI = DEVICE LEVEL INTERFACE
\* $A_{A1}$
A = A-CABLE
a = CHANNEL a
1 = SYSTEM 1
FIG.1B.
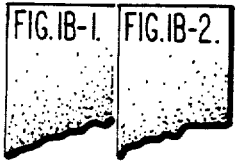

\# $B_{A2}$
B = B-CABLE
A = CHANNEL A
2 = SYSTEM 2

FIG. 2A. Host Adapter Basic Block Diagram.
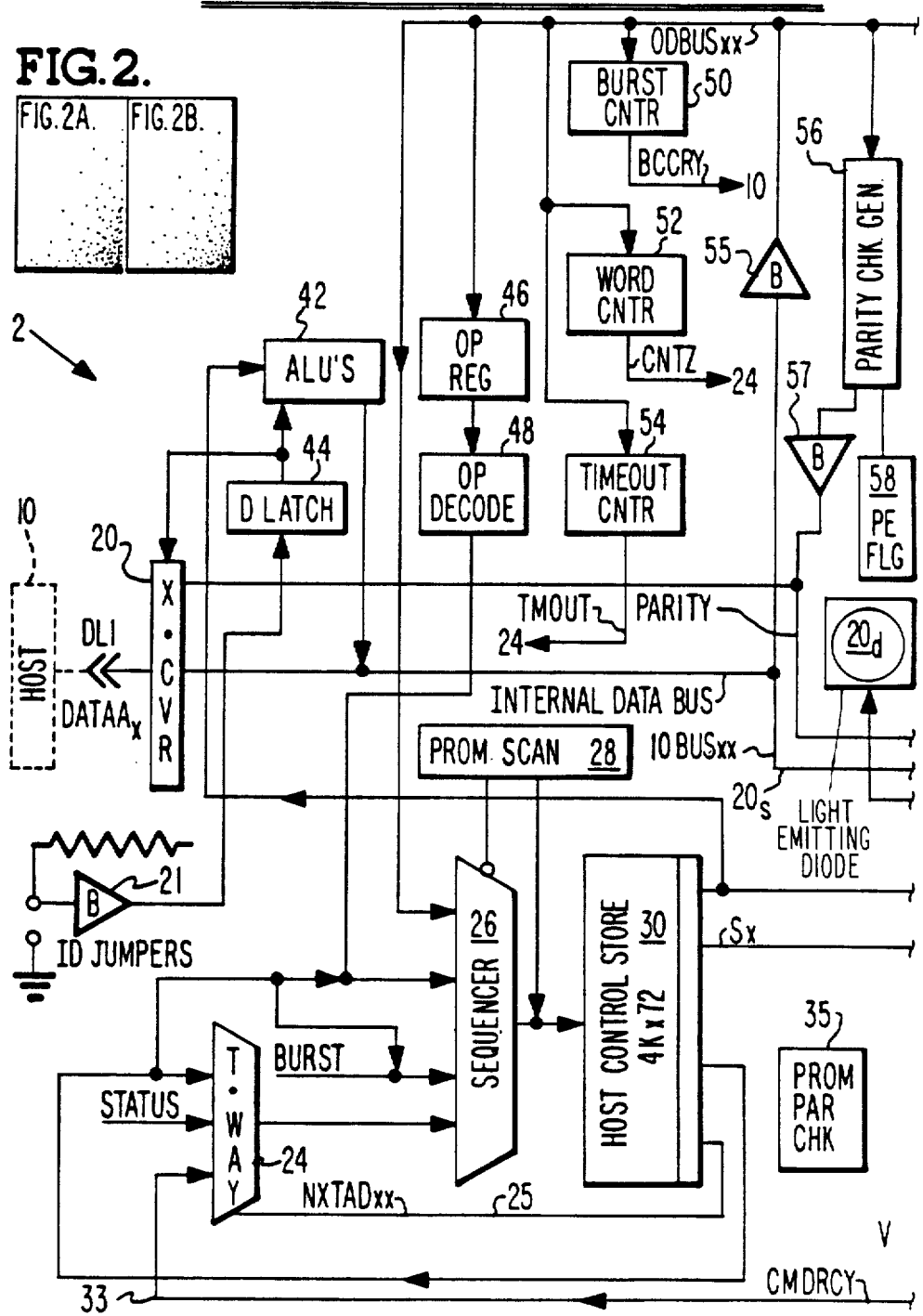

FIG. 3A. Formatter Card Basic Block Diagram.

| FIG. 3A | FIG. 3B |

FIG. 4A. Interface Card Basic Block Diagram.
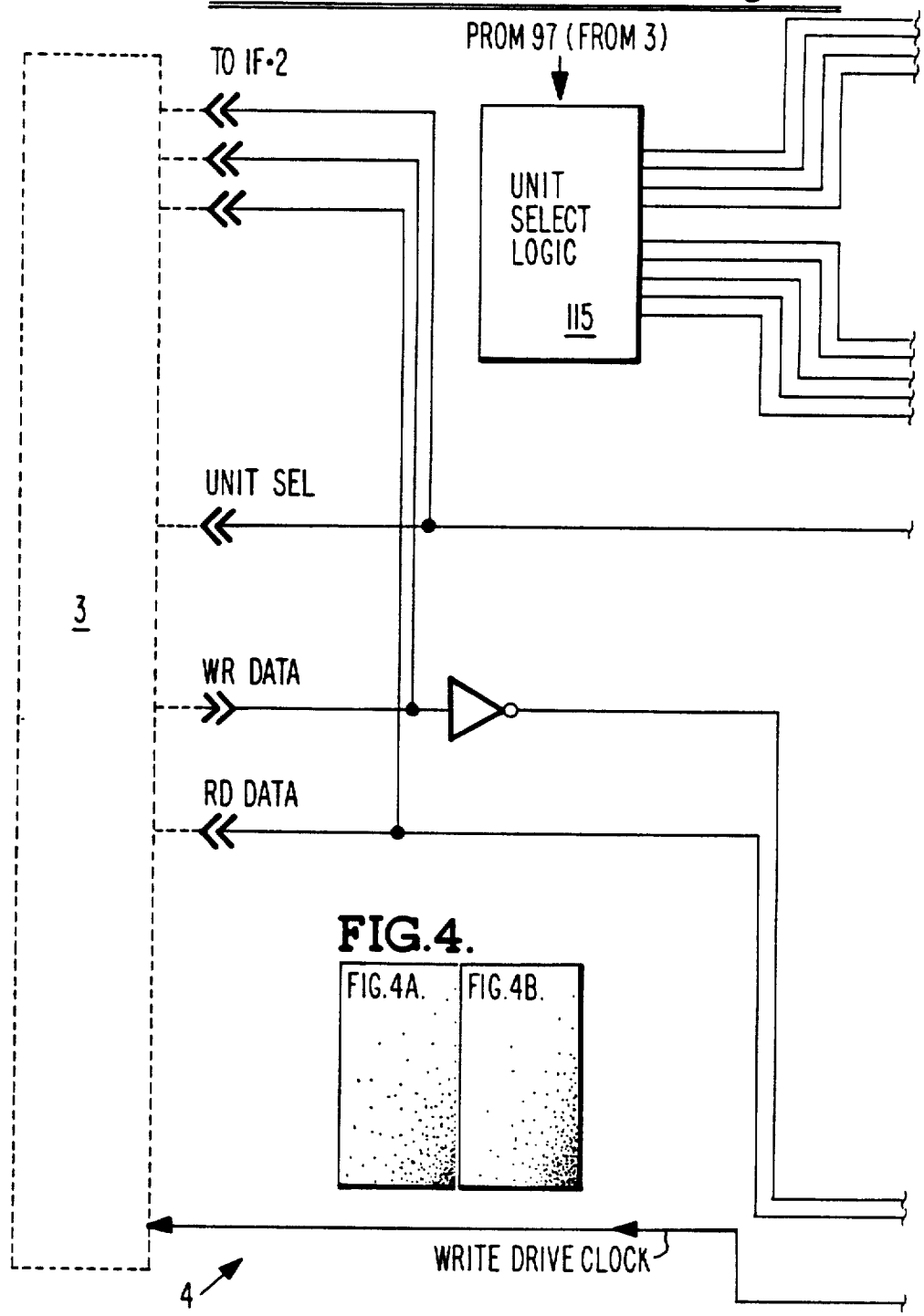

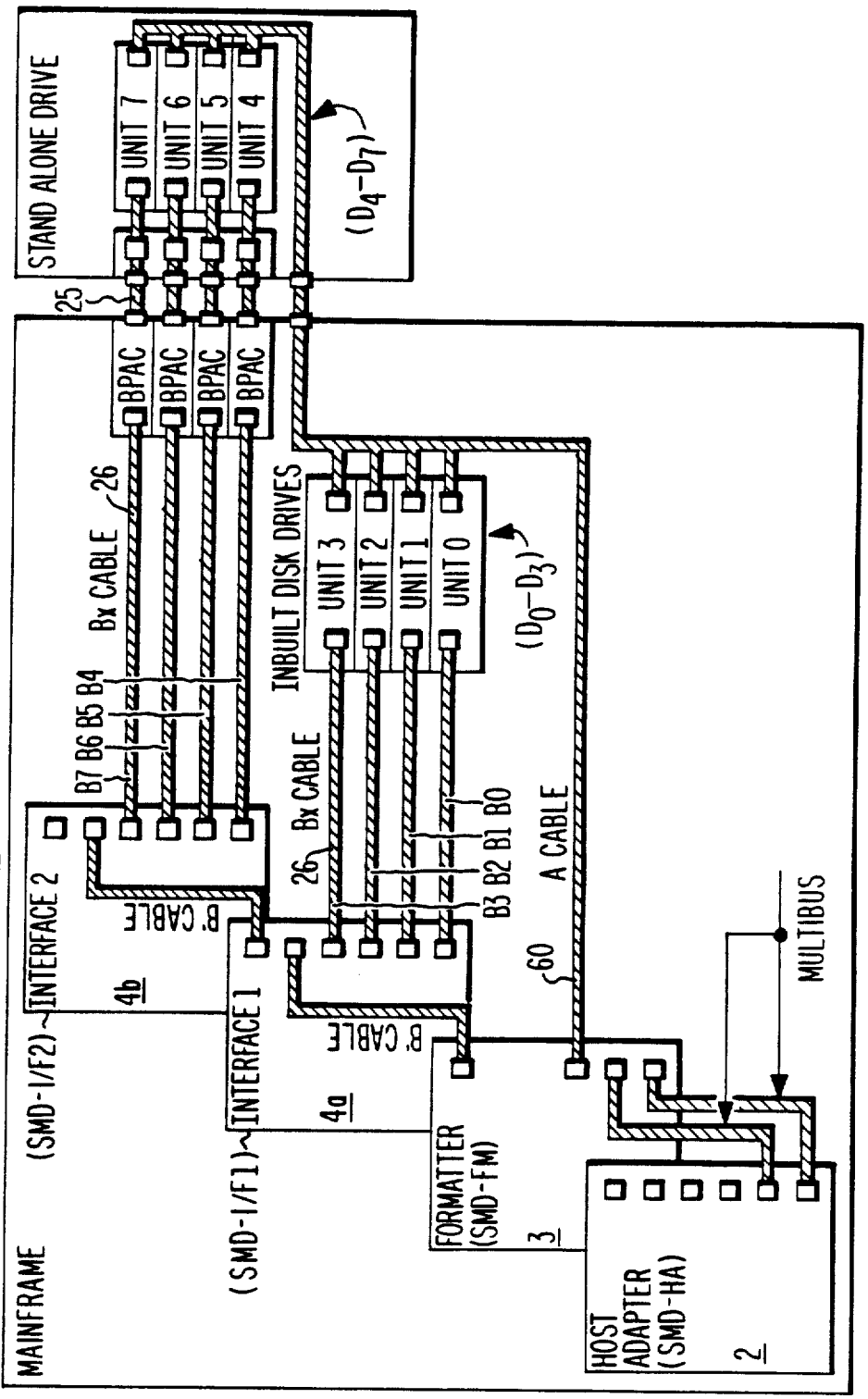
FIG.5. SMD DLP Cabling.

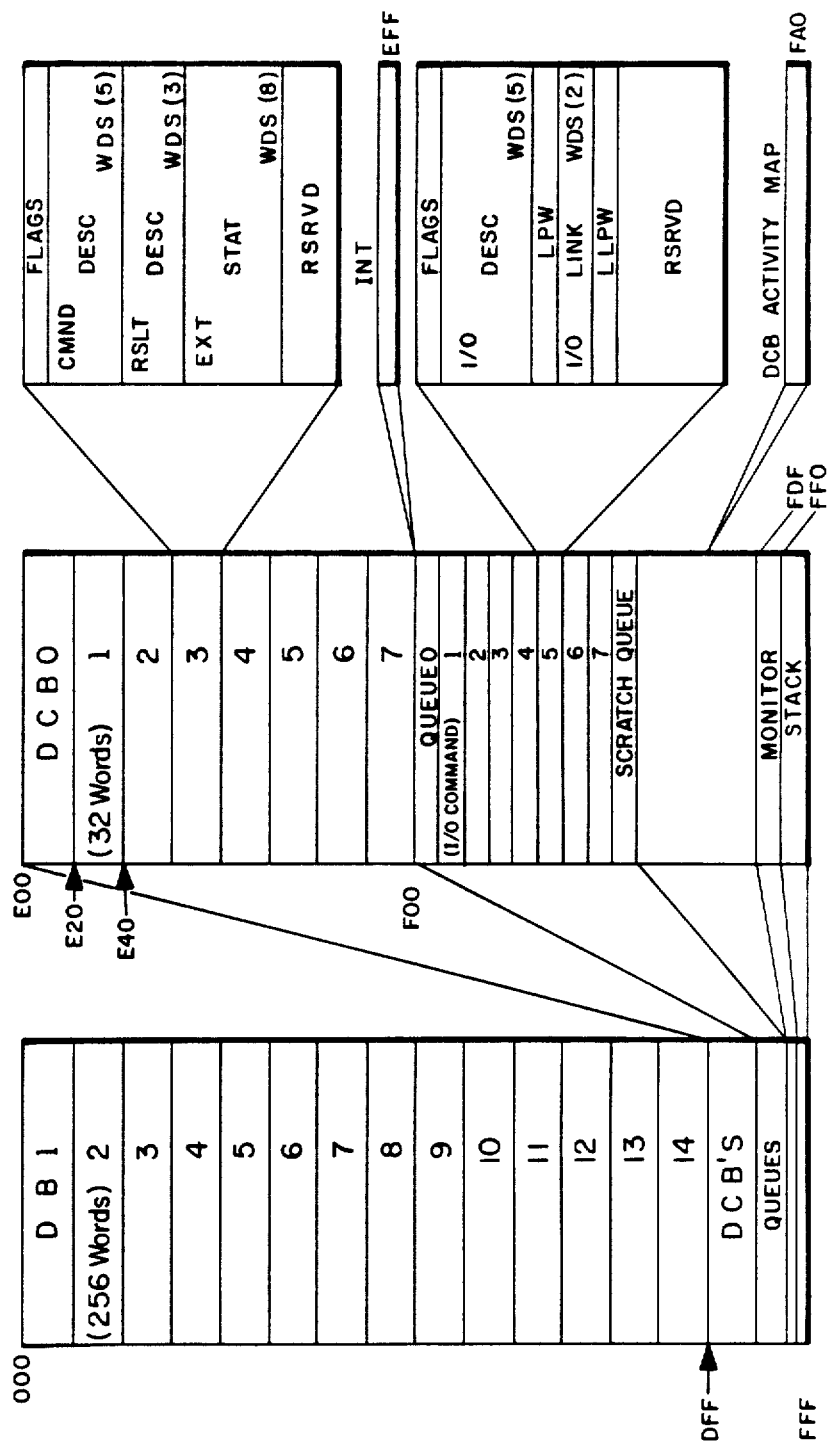
FIG. 6. SMD HA Memory Map 122, of Fig. 2.1

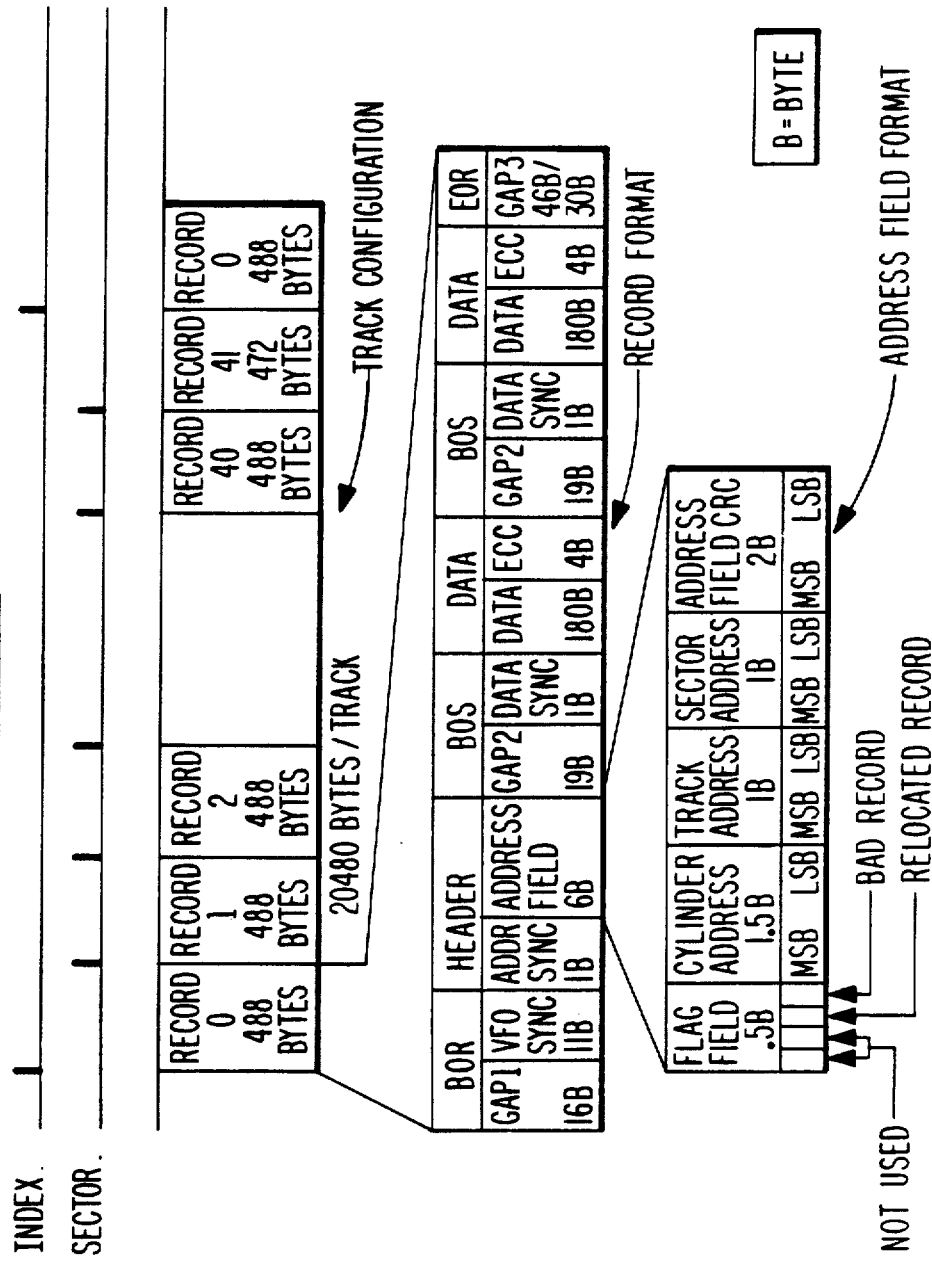
FIG. 7. Track / Sector Format.

FIG. 8.

| CYLINDER ADDRESS 1.5 BYTE | | | | | | | | | | | | TRACK ADDRESS 1 BYTE | | | | | | | | SECTOR ADDRESS 1 BYTE | | | | | | | |
|---|---|---|---|---|---|---|---|---|---|---|---|---|---|---|---|---|---|---|---|---|---|---|---|---|---|---|---|
| 2 | 1 | | | | | | | | | | | | | | | | | | | | | | | | | | |
| 0 | 0 | 5 | 2 | 1 | | | | | | | | | | | | | | | | | | | | | | | |
| 4 | 2 | 1 | 5 | 2 | 64 | 32 | 16 | 8 | 4 | 2 | 1 | | 128 | 64 | 32 | 16 | 8 | 4 | 2 | 1 | | 128 | 64 | 32 | 16 | 8 | 4 | 2 | 1 |
| 8 | 4 | 2 | 6 | 8 | | | | | | | | | | | | | | | | | | | | | | | |
| C | C | C | C | C | C | C | C | C | C | C | C | T | T | T | T | T | T | T | T | S | S | S | S | S | S | S | S |

C = CYLINDER ADDRESS
    MRX 214 : ∅→24C HEX (∅→588 DECIMAL)
    MRX 226 : ∅→337 HEX (∅→822 DECIMAL)

T = TRACK ADDRESS
    MRX 214 : ∅→6
    MRX 226 : ∅→9

S = SECTOR ADDRESS
    MRX 214 : ∅→53 HEX (∅→83 DECIMAL)
    MRX 226 : ∅→53 HEX (∅→83 DECIMAL)
    [ONLY EVEN SECTOR NUMBERS ARE RECORDED IN THIS FIELD, ∅, 2, 4, ... 82]

DATA TRANSFER SYSTEM USING TWO PERIPHERAL CONTROLLERS TO ACCESS DUAL-PORTED DATA STORAGE UNITS

CROSS REFERENCE TO RELATED APPLICATIONS

This application is related to copending application entitled "Peripheral-Controller for Multiple Disk Drive Modules", filed Sept. 27, 1985, as U.S. Ser. No. 780,864, by Ronald S. Coogan; and "Self-Testing Peripheral-Controller System", filed Sept. 27, 1985, as U.S. Ser. No. 780,762, by Ronald S. Coogan.

FIELD OF THE INVENTION

This disclosure relates to systems of peripheral controllers which are used to manage the transfer of data between a plurality of host computer systems and a plurality of peripheral devices such as disk drive units.

BACKGROUND OF THE INVENTION

A continuing area of developing computer technology involves the transfer of data between a main host computer system and one or more peripheral terminal units. To this end, there have been developed I/O subsystems which are used to relieve the monitoring and housekeeping problems of the main host computer and to assume the burden of controlling peripheral terminal units and to control the execution of data transfer operations which need to occur between the peripheral terminal units and the main host computer system.

A particular series of I/O subsystems has been developed which uses peripheral controllers known as "data link processors" whereby initiating commands from the main host computer are forwarded to the data link processor which manages the data transfer operations with one or more peripheral units. In these systems, the main host computer provides a "data link word" which identifies each task that has been initiated for the data link processor. After the completion of the given task, the data link processor will notify the main host computer system with a result-descriptor word to inform it as to the completion, incompletion, or problem involved in that particular task.

These types of data link processors or peripheral controllers have been described in a number of patents issued to the assignee of the present disclosure and these patents are included herein by reference as follows:

U.S. Pat. No. 4,106,092 issued Aug. 8, 1978 entitled "Interface System Providing Interfaces to Central Processing Unit and Modular,Processor-Controllers for an Input Output Subsystem", inventor D. A. Millers, II.

U.S. Pat. No. 4,074,352, issued Feb. 4, 1978, entitled "Modular Block Unit for Input-Output Subsystem", inventors D. J. Cook and D. A. Millers, II.

U.S. Pat. No. 4,162,520, issued July 24, 1979, entitled "Intelligent Input-Output Interface Control Unit for Input-Output Subsystem", inventors D. J. Cook and D. A. Millers, II.

U.S. Pat. No. 4,189,769, issued Feb. 19, 1980, entitled "Input-Output Subsystem for Digital Data Processing System", inventors D. J. Cook and D. A. Millers, II.

U.S. Pat. No. 4,280,193, issued July 21, 1981, entitled "Data Link Processor for Magnetic Tape Data Transfer System", inventors K. W. Baun and J. G. Saunders.

U.S. Pat. No. 4,313,162, issued Jan. 26, 1982, entitled "I/O Subsystem Using Data Link Processors", inventors K. W. Baun and D. A. Millers, II.

U.S. Pat. No. 4,390,964, issued June 28, 1983, entitled "Input-Output Subsystem Using Card Reader-Peripheral Controller", inventors J. F. Horky and R. J. Dockal. This patent discloses the use of a distribution card unit used to connect and disconnect the data link processor (peripheral controller) to/from a host computer as required to accommodate data transfer operations.

The above referenced patents, which are included herein by reference, provide a background and understanding of the use of the type of specialized peripheral-controllers known as "data link processors" (DLP) which are used in data transfer networks between a main host computer and various types of peripheral terminal units.

The present disclosure involves systems whereby "dual-ported" disk drive units are networked with these data link processors (peripheral-controllers) to provide a mutual intercooperation system for Read/Write operations on any one of a group of disk drive units.

The present data transfer systems use a peripheral-controller called the storage module device-data link processor (SMD-DLP) which provides features and solutions which were not available in earlier versions of similar data link processors.

For example, some peripheral-controllers (DLP's) required an "Emergency Request" cycle from DLP to the host computer to establish a communication channel for data transfer service when conditions of overload or underload occurred. This was especially so in systems using magnetic tape peripherals.

In the peripheral-controllers described herein for disk drive modules, this need for an "Emergency Request" cycle is eliminated since the disk data can easily be accessed or not on the next turn of the disk and since the amount of data in a sector is of a limited quantity. Another feature in the described peripheral-controllers is the use of "one logical address" to select an area of two physical sectors of data wherein the least significant bit (LSB) of the address field will select either the first or second physical sector.

To handle the situation of different characteristics of various disk drive units, an attribute table in a PROM (of the peripheral-controller) is used to provide information to the SMD-DLP as to "characteristics" of the selected disk drive module. This PROM table informs the DLP as to sector numbers, beginning addresses, ending addresses, number of track-heads available in a particular disk unit, and the number of bytes per track in each unit. Thus, rapid and accurate sector location and data transfer operations can occur.

Since two sets of interface unit cards are used to communicate with two groups of disk drives (each group handling four (4) disk drive modules), the selection of one interface card is accomplished through a unit select logic circuit after verification that only one disk unit has properly responded for use in data transfer operations.

The handling of up to eight disk drives by one data link processor (DLP) is facilitated by a queue file section in buffer memory which can store up to eight I/O commands for later execution. However, the system also provides for immediate execution of an I/O command even while commands remain stored in the queue file.

These and other features are provided by the described data link processor for multiple disk drive modules.

SUMMARY OF THE INVENTION

In the preferred embodiment of this disclosure, a data transfer network is provided whereby each of a multiplicity of disk drive units have dual port elements to permit several additional desirable functions to be accomplished, namely (i) to permit faster access to a disk unit by a "second" data link processor (I/O controller) once a "first" data link processor has completed its access to a particular disk drive unit, and (ii) to gain access to a particular disk drive unit by a "second" data link processor when a "first" data link processor is inoperative or has lost its capability of accessing the particular disk drive unit.

The network of this disclosure involves disk drive units having dual ports which enable at least two data link processors to access any given disk drive unit in order to permit faster access and to control management of data transfers should one of the data link processors (DLPs) fail to function.

The present disclosure also involves a data transfer network wherein a plurality of data link processors is used to manage and control data transfers between first and second host computer systems and groups of disk drive storage units connected to each system.

An auxiliary interface unit in each data link processor permits a cross coupling between systems so that the data link processor of one system can access the disk drive units of another system to execute Read/Write operations.

The storage module device-data link processor described herein provides for data communication between a main host computer and up to eight separate disk drive units. The data link processor includes three functional sections known as the host adapter unit, the formatter unit and the peripheral interface unit which, in combination, function to monitor and control data transfer operations between any one selected disk drive unit and the main host computer system.

The host adapter unit receives the I/O command descriptors from the host system, verifies their correctness and checks their parity, and provides a queue list in a buffer memory of the host adapter, which indicates the jobs or tasks to be accomplished with each of the eight disk drive units.

The command task information is processed and conveyed to the formatter unit which formats information from an attribute table in the formatter in order to provide address data as to the particular cylinder, track-head, and sector to be accessed in a selected disk drive unit. This information is passed on through the peripheral interface card unit which communicates directly to the selected disk drive unit.

Unit select logic in the peripheral interface card unit insures that only one selected disk drive unit will be communicated with at any given time.

BRIEF DESCRIPTION OF THE DRAWINGS

FIG. 1B is drawn on two separate sheets which are indicated as FIGS. 1B-1 and 1B-2;

FIG. 2 is drawn on two sheets which are described as FIGS. 2A and 2B;

FIG. 3 is drawn on two separate sheets which are indicated as FIGS. 3A and 3B.

FIG. 4 is drawn upon two sheets which are designated as FIG. 4A and FIG. 4B;

FIG. 5 is a schematic diagram of the three sub-units of the data link processor and their cable connections to a plurality of disk drive units;

FIG. 6 is a schematic diagram of the data buffer RAM of the host adapter unit of the data link processor;

FIG. 7 is a schematic layout drawing showing the format that is used for track/sector control in the disk drive unit of the network.

FIG. 8 is a drawing showing a layout of the bit locations for the cylinder address, track address, and sector address.

DESCRIPTION OF PREFERRED EMBODIMENT

Figure 1A:
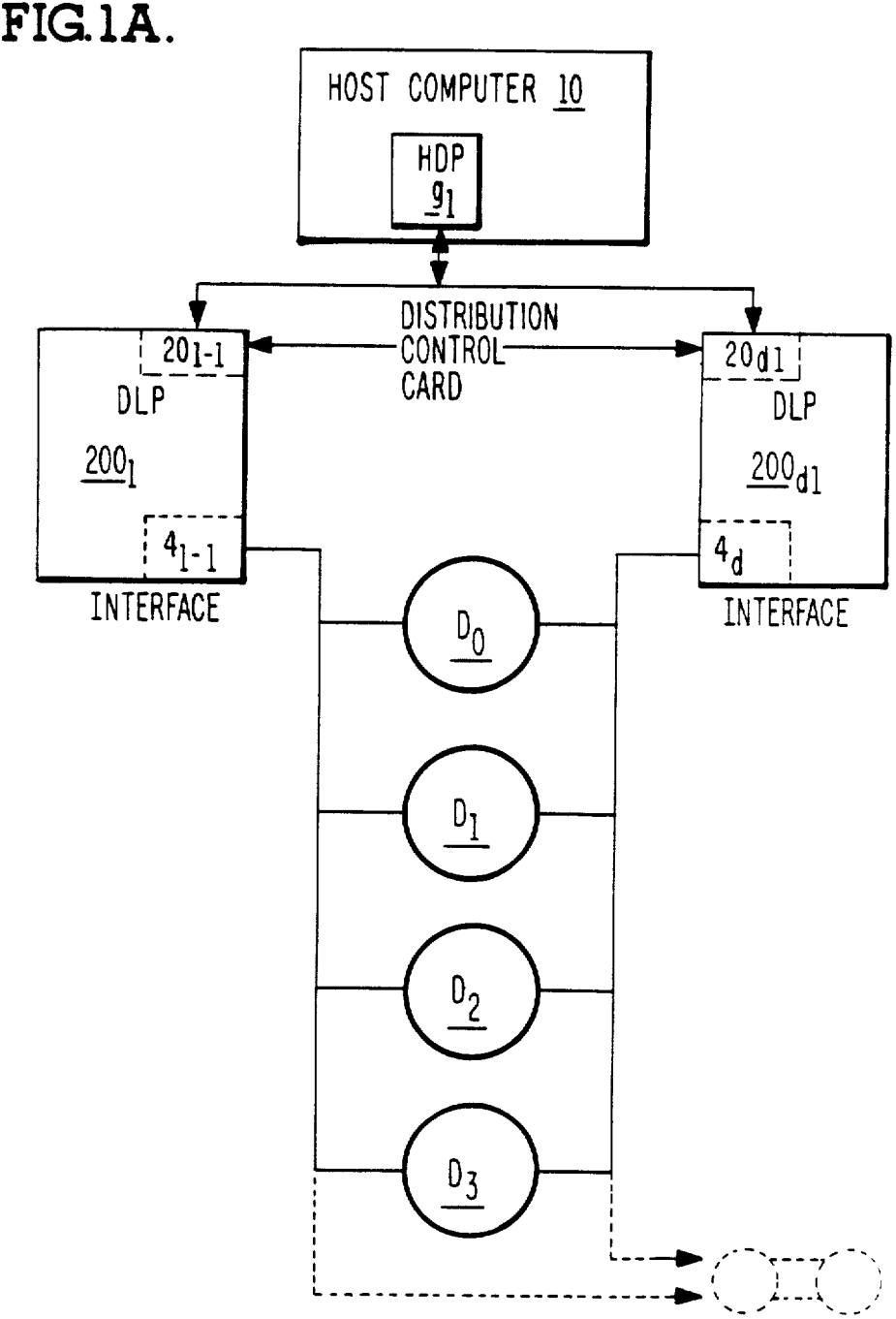
FIG. 1A is a network showing how a disk unit can be accessed by either one of two data link processors.

Referring to FIG. 1A, there is seen a system using a plurality of disk drive units each of which has dual connecting ports to a first ($200_1$) and a second ($200_{d1}$) data link processor (DLP).

Each DLP can access disk units $D_0$, $D_1$, $D_2$, $D_3$, etc. The host computer 10 has a host dependent port (HDP) $9_1$ which communicates to a first DLP $200_1$ and a second DLP $200_{d1}$ through a distribution control card, ($20_{1-1}$ and $20_{d1}$) as described in U.S. Pat. No. 4,390,964 as previously discussed.

Thus, for example when DLP $200_1$ has finished a Read or Write operation with disk unit $D_0$, then the second DLP $200_{d1}$ can access disk drive $D_0$ for a Read or Write operation while the first DLP $200_1$ is communicating data to/from host 10. Thus, rapid use can be effectuated of a particular disk unit because of the dual ports on the disk unit.

Similarly, another advantage can occur in that while the "first" DLP $200_1$ is executing a Read/Write operation with disk unit $D_0$, the "second" DLP $200_{d1}$ can simultaneously be executing a Read/Write operation with another disk unit such as $D_1$.

Of course, the data transfer operations between host 10 and the DLPs $200_1$ and $200_{d1}$ cannot occur simultaneously since each DLP must take its turn in communicating with the host 10. However, since each DLP has its own buffer memory, the DLPs can simultaneously do data transfers with two separate disk units and store the information for a later time when access to host 10 occurs.

The network system of FIG. 1A is also useful as a fail-safe system when either DLP $200_1$ or $200_{d1}$ should become inoperative; then the host 10 can direct the surviving DLP to access a particular disk drive unit at those time periods when the defective DLP is not functioning.

Figures 1, 1B, 2:
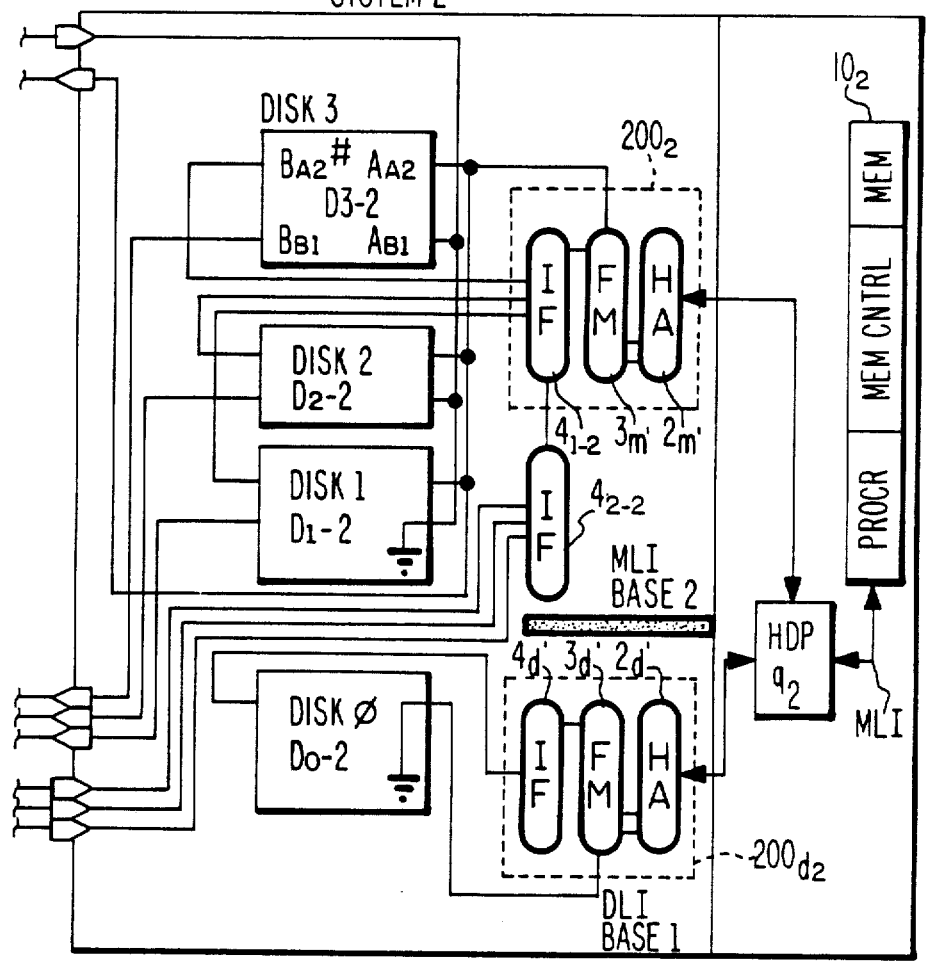
FIG. 1 is a network drawing showing how the disclosed data link processor interfaces the host system to a plurality of disk drive units.
FIG. 1B is a drawing showing how two separate computer systems can be arranged to handle not only their own sets of disk drives but also the disk drives associated with another computer system.
FIG. 2 is a block diagram of the section of the data link processor called the host adapter unit.
Figure 2B:
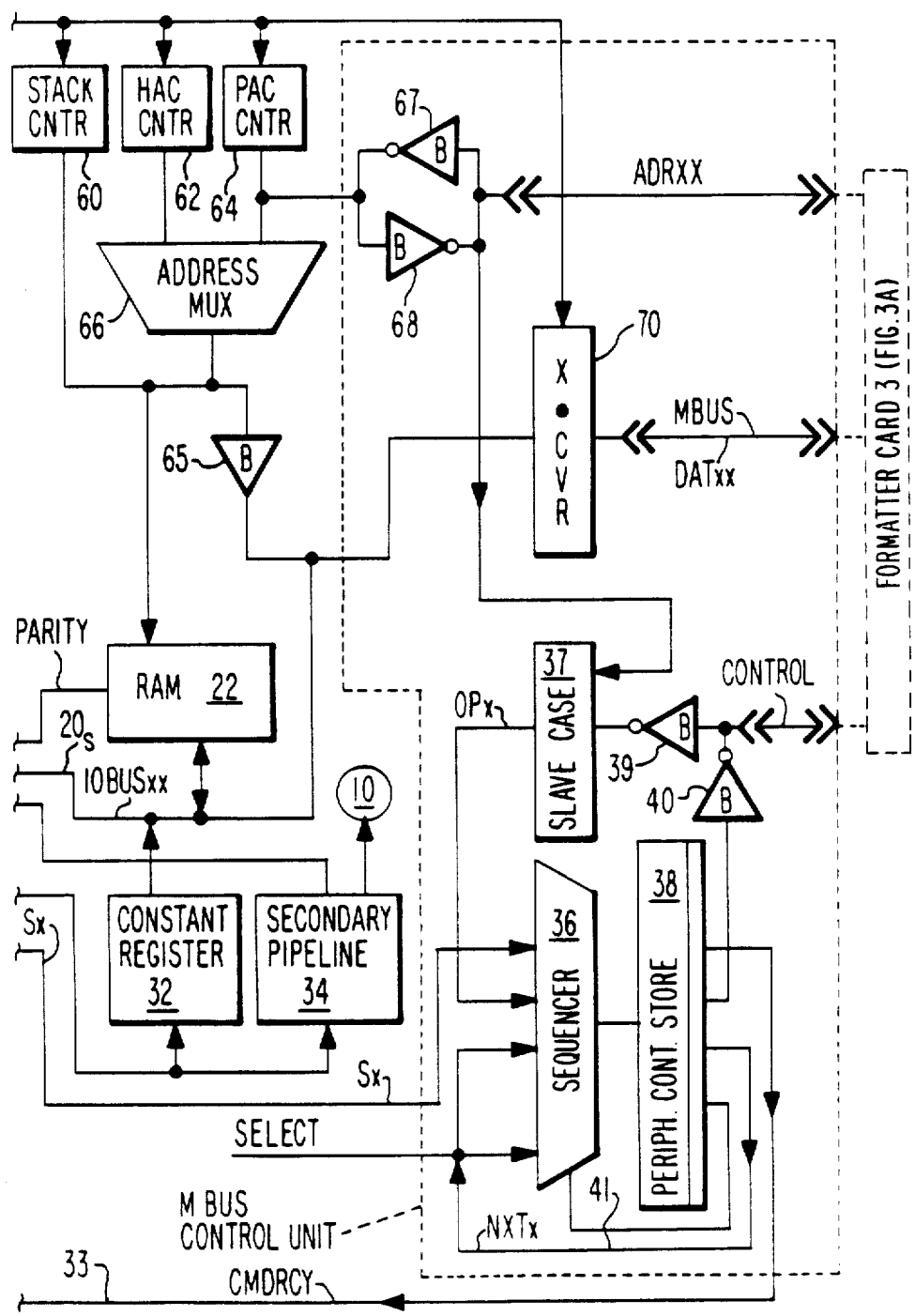

Referring to FIG. 1B, there is seen a network configuration involving two host computer systems $10_1$ and $10_2$. Each system has a host dependent port $9_1$ and $9_2$ which communicates to a pair of data link processors.

Thus, the first host system $10_1$ connects to DLP $200_1$ and DLP $200_{d1}$.

The second host system $10_2$ connects to DLP $200_2$ and DLP $200_{d2}$. Each system can independently execute Read/Write operations with its own set of disk units. For example, host $10_1$ uses disk drive $D_{0-1}$ to store the master control program (MCP) for use in effectuating Read/Write operations on disk drives $D_{1-1}$, $D_{2-1}$, $D_{3-1}$. Likewise, host $10_2$ uses disk drive $D_{0-2}$ to store the master control program (MCP) for use in effectuating Read/Write operations on disk drives $D_{1-2}$, $D_{2-2}$, $D_{3-2}$.

However, the network of FIG. 1B is designed so that system 1 and system 2 are mutually supportive. This is accomplished by use of an auxiliary interface unit ($4_{2-1}$ and $4_{2-2}$) in both system 1 and system 2.

As seen in FIG. 1B and FIGS. 2, 3, 4 each data link processor is made of a host adapter 2, a formatter 3, and an interface unit 4. These units are described in detail in subsequent pages.

Thus in FIG. 1B, there is seen an auxiliary interface unit $4_{2-1}$ which connects to the main interface unit $4_{1-1}$ of system 1. Likewise in system 2, another auxiliary interface unit $4_{2-2}$ connects to main interface unit $4_{1-2}$. The auxiliary interface unit $4_{2-1}$ permits the data link processor $200_1$ (DLP) of system 1 to access and to execute Read/Write operations on the disk drive units of system 2. And similarly, the auxiliary interface unit $4_{2-2}$ of system 2 permits the DLP $200_2$ to access and execute Read/Write operations on the disk drives of system 1.

Thus, the mutually supportive network of FIG. 1B permits a fail-safe operation if one DLP should fail by permitting the DLP from another system to take over access of disk drive units each of which has dual ports.

As will be noted in FIG. 1B, each of the DLPs in system 1 (marked as $200_1$ and $200_{d1}$) has the same type components, that is, a host adapter ($2_m$ and $2_d$), a formatter ($3_m$ and $3_d$) and interface unit ($4_{1-1}$ and $4_d$).

Likewise, each DLP in system 2 (marked as $200_2$ and $200_{d2}$ in FIG. 1B) has the components of: host adapter ($2_{m'}$ and $2_{d'}$), a formatter ($3_{m'}$ and $3_{d'}$), and interface units ($4_{1-2}$ and $4_{d'}$).

The auxiliary interfaces $4_{2-1}$ and $4_{2-2}$ permit the cross-coupling between system 1 and 2. Thus, DLP $200_2$ can access the disk drives of its own system 2 or alternatively the disk drives of system 1.

Likewise, DLP $200_1$ can access the disk drives of system 1 or alternatively the disk drives of system 2.

Referring to FIG. 1, there is seen a data transfer network system, whereby the main host computer designated as host system 10 communicates over a set of buses designated as DLI/MLI (data link interface-message level interface) to a peripheral controller herein called a data link processor and specifically a storage module device-data link processor (SMD-DLP) $200_d$. The output of the data link processor includes an interface which has bus connections to a series of disk drives $D_0$ through $D_7$. Thus, the network provides for data transfer operations between eight disk drive units and the host system 10 by means of the peripheral-controller $200_d$.

As will be seen in FIG. 5, the storage module device-data link processor (SMD-DLP) is made up of three separate units which are seen as the host adapter unit 2, the formatter unit 3 and the interface unit 4 which may be formed of first and second interface boards $4_a$ and $4_b$.

A series of disk drives designated as $D_0$ through $D_7$ are shown connected to the data link processor through different sets of cables.

Referring to FIG. 5, the A cable may connect the formatter 3 to each and everyone of the disk drive units $D_0$ through $D_7$ on a daisy chain connection basis.

Likewise, the first interface $4_a$ may use the $B_x$ cable to connect to disk drives $D_0$ through $D_3$. Then the cable designated as the $B_y$ cable can be used to connect the second interface $4_b$ over to the disk drives $D_4$ through $D_7$.

An "M bus" (FIGS. 2, 3) is used to connect the host adapter 2 to the formatter card unit 3. Then a cable B' (FIG. 5) is used to connect the formatter 3 to the interface card unit $4_a$ and to the second interface unit $4_b$.

Host Adapter Card Unit 2

Shown in FIG. 2 is a block diagram of the host adapter unit which connects the host computer system 10 to the data link processor $200_d$, indicated in FIG. 1.

As seen in FIG. 2, a transceiver 20 connects to the host system 10 by means of a data link interface bus designated DATAAx. The transceiver 20 connects to an I/O bus $20_s$ which has a terminal transceiver 70. The transceiver 70 connects to an M bus designated DATXX which connects to the formatter card unit 3.

A RAM buffer 22 is connected to the I/O bus $20_s$ in order to temporarily hold data words which are being transferred between the host system and the disk systems. A more detailed exposition of the buffer RAM 22 will be later described in connection with FIG. 6.

The general purpose of the data link processor $200_d$, as effectuated by its three sub-unit cards, is to select one of the eight disk drive units, then to address certain areas of the selected disk and execute a data transfer routine either in the read direction or in the write direction and at the same time to concurrently assure that data integrity is maintained so that error free data transfers will occur in all instances.

The basic purpose of the host adapter card unit 2 (FIG. 2) is to receive I/O descriptor commands from the host system 10 and verify the command to make sure that it is correct, including the making of parity checks. The host adapter card unit 2 will place the I/O descriptor command from the host system into its RAM buffer 22 into the queue area (FIG. 6) starting at the hex address FOO. Thus, I/O descriptor commands are placed into eight separate areas, each of which involves a command function to be executed with respect to each of the eight disk drives connected to the system. Thus, the queue area of the buffer memory 22 shown in FIG. 6 can store up to eight basic data transfer commands which will subsequently be executed by the data link processor $200_d$.

The commands for operators which are stored in the queue file blocks are designated as "queueable OPs". However, there is also provision for an "immediate OP", whereby the execution of a command may be effectuated without going through the queue of the buffer memory 22.

In operation, the data link processor will do a "seek" function, whereby an operator OP will be taken from the queue area and placed into the area known as the device control block or DCB. As seen in FIG. 6, there are eight DCB areas or device control block areas designated as DCB0 up to DCB7. These occupy the hex addresses from E00 up to the beginning of the queue area at hex FOO. Each of the device control blocks consists of 32 words which are sent to the formatter 3 which will then develop the track/sector format which is illustrated in FIG. 7.

The OP information in the DCB of buffer 22 that is selected will be used to "wake up" the formatter into action.

Referring to FIG. 2 and the host adapter card unit 2, a series of input signals are fed to the sequencer 26 to select microcode from the host control store 30. The host control store 30 is the main engine for controlling and operating the data link processor $200_d$. The sequencer 26 receives various data signals which are multiplexed into the host control store 30 in order to select routines which permit decisions for which branch operations are to be performed by the microcode of the control store 30.

The sequencer 26 receives signals from the OP register 46 and OP decoder 48, burst carry signals from the burst counter 50, "command received" signals from the line 33 to the multiplexor test-input 24 (T-Way) and also from the PROM scan 28, in addition to signals from the control store 30 which are fed back on lines 24 and 25.

The status input signals to the test-input multiplexor 24 involves a multiple number of test points connected throughout the host adapter unit 2. These test points include connections for buffer memory management control, ALU status, counter status (of elements 50, 52, 54), DLI interface control, M-bus monitoring and handshaking, and status of operator (OP) types.

The stack counter 60 counts the locations in the RAM buffer 22 that point to branch addresses in the control store 30.

The host access counter 62 is a counter for the RAM buffer 22 which is used to count data words transferred to/or from the host system and the buffer 22.

The peripheral counter 64 is a counter used to count the number of data words transferred between the RAM buffer 22 and a selected one of the disk file units of FIG. 1.

The word counter 52 is used as a "block counter" which will count up a specific number of words such as 256 words in order to signify the counting of a block of data. This counter provides an output "CNTZ" which is fed to the control store 30 via MUX 24.

The address multiplexor 66 receives input data from the host counter and the peripheral counter, in addition to address data from the formatter card unit 3. This count data is fed to the RAM buffer 22 in order to address various locations in the RAM buffer 22.

The peripheral counter 64 is operated so as to count only up to the number 4,000 which is equivalent to the address DFF (hex) which can be seen in FIG. 6 in the data buffer section which holds 16×256 words (with parity). The section designated DB1 through DB14 represents 14 blocks of words, each having 256 data words in it. At the address DFF, the address pointer will return to the first block at 000.

The burst counter 50 is used to count blocks of data words (each block is 256 data words) which provides a carry signal BCCRY which is sent to the host control store 30 to indicate that a block of data has been sent to the host 10.

The time-out counter 54 is used to put a time-out data signal to the control store 30 if certain conditions do not occur by a preset time.

The OP register 46 and the OP decoder 48 will receive an operator signal (OP) from the control store 30. The OP register 46 provides an address to the OP decoder 48 which is a PROM which will provide signal data to sequencer 26 for the control store 30.

The arithmetic logic units 42 receive microcode signals from the control store 30 which can be used to process data such as performing various logical operators and/or shifting and manipulating data which can then be returned back to the I/O bus $20_s$. This processed data can be sent onto the M bus of FIG. 2.

The D latch 44 is a pipeline register which can receive data from a disk drive unit and formulate a longitudinal parity word for error checking purposes. Thus, data from a selected disk file will be transferred to the buffer RAM 22 and then placed in the D latch 44, after which it can be transferred to the transceiver 20 for transmission to the host 10 which can then verify the longitudinal parity word.

The PROM scan unit 28 is used to tri-state the sequencer 26 and acts as a downcounter in order to deliver address data for the control store 30, so that PROM parity check unit 35 can verify the correctness of data from control store 30.

The circuit block designated PROM parity check 35 is used as a parity checker to verify odd parity.

The constant register 32 is used to provide a data field for the control store 30 so as to provide a basic data pattern for initialization operations.

The secondary pipeline register 34 is used for interface purposes to the host system 10 to provide handshake operations. This provides extra control in conjunction with the control store 30.

The peripheral control store 38 is used to control the M bus and the interface to the formatter card unit 3. This is done through a gate 40. A sequencer 36 receives various input data in order to select microcode routines in the control store 38. The sequencer 36 receives data from the slave case 37 on the line OPx and also receives data from the control store 30 on line $S_x$ in addition to feedback data on line 41 and select signals from receiver 39.

A series of driver gates, FIG. 2, will be seen to connect to the formatter card unit 3 in order to provide bi-directional transfers. The gates 67 and 68 connect the address lines to and from the formatter unit 3. The gates 39 and 40 connect the control line data between the formatter unit 3 and the host adapter.

The address lines ADRXX in FIG. 2 are the "wake up" lines which are used to activate the system to read the selected data control block ($DCB_x$) in the buffer memory 22 of FIG. 6.

In FIG. 2, the transceiver 70 connects the M bus between the formatter unit 3 and the host adapter 2. This provides a bi-directional connection for data words to be transferred between the two units.

The multiplexor test signal unit 24, designated "T-Way" can be considered as a "test input" unit, whereby certain status data inputs are multiplexed into the sequencer 26, as were previously enumerated.

The pipeline register 44, designated as D latch, is a data register used to store input data to ALU 42 (FIG. 2). This unit type is described in a publication entitled "Bipolar Microprocessor Logic Interface" at page 5-166, and published by the Advanced Microdevices, Inc. of 901 Thompson Place, Sunnyvale, Calif. 94088.

It should be noted that the data link processor $200_d$ is provided with self-test routines which allow internal operation of the various card units to be checked before actual data word transfer operations are initiated.

The slave case 37 is a PROM unit which is used for restricting any invalid operators which come from the formatter card unit 3. Thus, if any invalid command and address data from the formatter 3 are received, the slave unit 37 will operate to prevent any execution and to inform the host of such an invalid operator, via the result/descriptor.

The Formatter Card Unit 3

The formatter card unit has the purpose of selecting a disk drive to be communicated to and providing data whereby selected areas of the particularly selected disk drive may be accessed for either Read operations or for Write operations.

Figure 3:
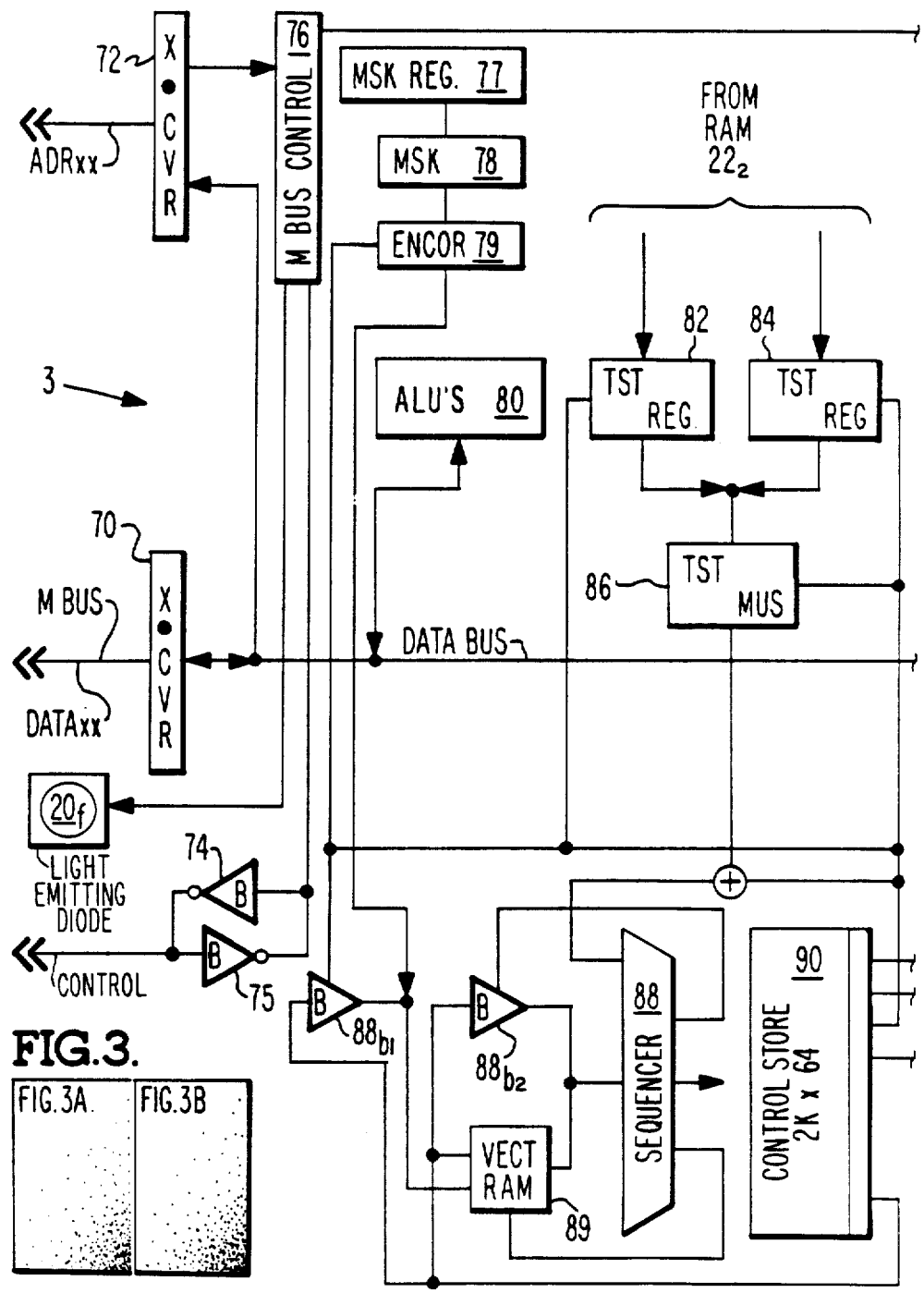
FIG. 3 is a block diagram of the section of the data link processor called the formatter card unit.
Figure 3B:
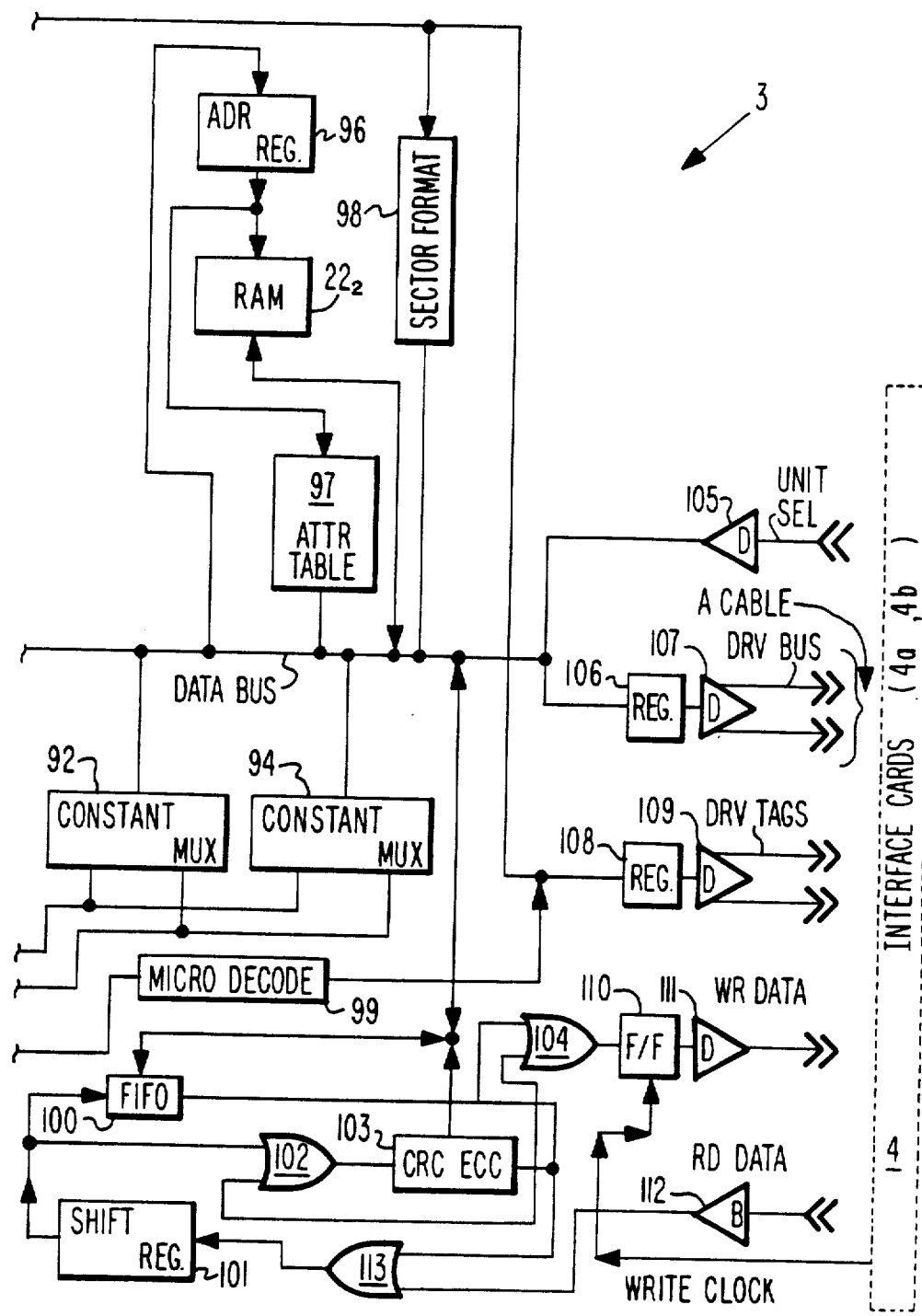

As seen in FIG. 3 data words are transferred between the formatter 3 and the host adapter 2 by means of a transceiver 70.

Address data between the host adapter and the formatter is transferred through the transceiver 70, which is controlled by the M bus controller 76 which receives control signals through the control line monitored by gates 74 and 75. The M bus controller 76 can also transmit information through gate 74 to the control line of FIG. 3.

Similarly to the host adapter card unit, the formatter card 3 has a control store 90 which receives input addresses from a microprogram controller sequencer 88. The sequencer 88 receives various data from test circuitry (82, 84, 86), from the control store 90, and from masking circuitry 77, 78 and 79. The vector RAM 89 is a counter similar to the stack counter 60 of FIG. 2 which provides address data to the control store 90.

In FIG. 3, a set of arithmetic logic units 80 are provided to the data bus in order that processing and data manipulation can occur for any data words on the data bus line.

The mask circuitry is composed of a mask register 77, a mask unit 78, and an encoder 79, which are used to eliminate unnecessary data and to pass required data to the vector RAM 89 to develop addresses for control store 90.

The test circuitry (82, 84, 86) receives 16 bits of data from the formatter RAM buffer $22_2$ in order to perform status tests and provide signal data to the sequencer 88 for the control store 90.

The constant multiplexors 92 and 94 are used as a repository of reset and initialization data patterns which are used to reset and initialize various circuitry after clearing operations.

An address register 96 is used to provide addresses both to the formatter buffer RAM $22_2$ and also to an attribute table 97. The attribute table 97 is a specific table of data which provides information as to sector numbers, beginning addresses, end addresses, the number of heads per drive and the number of bytes per track for each of the eight separate disk drive units.

The formatter buffer RAM $22_2$ is used as a data buffer to temporarily hold data words being transferred from the selected disk drive over to the host access adapter 2 card unit.

The unit, designated as sector format 98, has 84 sectors and 42 records to provide a pattern of zeros as required for the sector format protocol. It provides the pattern timing necessary for the formatting of a record containing two (2) sectors.

The micro-decoder 99 is used to decode the microcode received from the control store 90, and to select the sector format from unit 98, and to provide control data to M bus control circuit 76.

The register 100 is a first-in first-out register (FIFO) which is used for serial to parallel translation or from parallel to serial translation so that serial data received from the disk unit is translated into parallel form for transmission to the host and vice versa, whereby parallel data from the host is transferred into serial data for transmission to the selected disk drive.

The shift register 101 is used to transmit read data (which comes from the interface 4 through gate 112, gate 113 and register 101) into the FIFO 100 which data is then placed on the data bus. The unit 102 is a gate which feeds data to the cyclic redundancy checker and error correction code unit 103. Here, every data field is checked for accuracy and corrected by an error correction code if necessary.

Gate 104, flip-flop 110 and gate 111 are for retransmission of Write data from the FIFO 100 over to the interface 4 for transmission to the selected disk drive unit.

Gate 105 is for enabling the "unit select" (identification) signal from interface 4 into the formatter 3.

Register 106 and gate 107 permit data words to be transferred from the formatter data bus on the A cable (FIG. 5) to a selected disk drive as commands to be performed.

Register 108 and driver gate 109 permit data from the microcode decoder 99 to be transferred to interface unit 4 (FIG. 3).

Gate 104 and flip-flop 110 control the synchronization of data transfers by using the write clock signal from the disk drive.

Gate 109 is designated as driver (DRV) tags and will provide tag information data to the disk drive.

Format for Disk Drive Units: The disk packs which are used with the storage module device data link processor can be of the type which contain four and six platters respectively. The bottom side of the lowest disk is pre-written at the factory with reference servo patterns. Each pack is indexed from a signal derived from the servo track which denotes the beginning of a track. Data is stored in a 180 bytes per sector format. Sector addresses are stored on the pack in binary notation through the controller by means of the initialization function. The drive is preset in a soft-sectored mode which means that sector pulses are derived from variable byte counters synchronized to an index.

Each record is divided into three areas: (i) the control address area and (ii) the "two data" areas.

The control area is used to:

(1) Establish bit sync and character frame for the sector address;

(2) Contain the sector address;

(3) Contain delays (gaps) for head switching;

(4) Establish bit sync and character frame for the data;

(5) Contain error codes for address error detection.

The two data areas (ii) each contain the user data storage area on the track. All data areas are separated by control areas.

There are N spare records per cylinder located at the end of each cylinder, i.e., the last five records on the head with the highest number. The value of N, which can be different for each drive type, is specified in the device attribute table 97 which was described in connection with FIG. 3 on the formatter card unit. For example, in one type of disk drive the value of N is equal to "five" spare records.

The last cylinder of each unit is reserved for drive maintenance. The beginning and the ending sector addresses of the maintenance area are provided in the device attribute table 97.

Format Description: The disk pack will use the track/sector format which is shown in FIG. 7. A track is divided into 42 records (physical sectors), each record containing two parts of 180 bytes (logical) sectors. Each record consists of a beginning-of-record (BOR) gap, a header, two sectors (each with a beginning of sector gap) and an end-of-record (EOR) gap.

The Header (FIG. 7): The header consists of: an address sync byte (19 HEX), and address field. The address field is further sub-divided into: (i) a flag field, (ii) a cylinder address field, (iii) a track address field, (iv) a sector address field, and (v) an address-cyclic redundancy check (CRC) field. A four bit flag field contains a flag bit designated "bad sector", and also contains a flag bit designated "relocated sector", in addition to two reserved bits (which are always 0).

Sector (FIG. 7): Each sector consists of:
A beginning-of-sector (BOS) gap;
A data sync byte (19 HEX); this is a "binary" 001 1001;
A 180 byte data area;
A data error correction code (ECC) field.

The "gaps" contain all zeros. The size of the end-of-record (EOR) gap is different for the last sector of each track.

As seen in FIG. 7, each field can be defined as follows:

(1) GAP 1: 16 bytes—this is required to allow for head selection (5 microseconds minimum).

(2) VFO Sync: 11 bytes—this contains all zeros. This allows the variable frequency oscillator (VFO) in the disk drive to synchronize to new data transitions and the speed of the disk. It is contained in the BOR and also in the GAP 2.

(3) ADDRESS SYNC: 1 byte—this identifies the beginning of the address field and synchronizes the byte counters in the controller. It is a Hex 19 pattern.

(4) ADDRESS FIELD: 6 bytes—this consists of a four bit flag field, a 12 bit cylinder address field, an eight bit track or head address, then eight bits (1 byte ) of sector address and two bytes of CRC (cyclic redundancy check) error codes for address error detection.

(5 ) GAP 2: 19 bytes—this contains all zeros. This includes one byte for WRITE splice which allows time for the WRITE driver turn-on and 11 bytes minimum for the VFO sync. The rest is required by controller delays.

(6) DATA SYNC: 1 byte—this identifies the beginning of the data field and synchronizes the byte counters in the controller. This is a Hex 19 pattern.

(7) Data Field: 180 bytes—this is the user data field.

(8) Data ECC Field: 4 bytes—the data error detection and correction code. ECC is encoded by the correction controller 103 for each 180 bytes of data field and is subsequently decoded.

(9) GAP 3:—this constitutes 46 bytes for records 0–40, and constitutes 30 bytes for record 41. This EOR (end-of-record) gap contains all zeros at the beginning and then transits to the WRITE gate turn-off. There must be a minimum of four bytes of zeros to prevent WRITE turn-off transients from causing errors, and there must be a byte (8 bits) of zeros for delay times due to WRITE encoding/READ decoding. This may be juggled with GAP 1 depending on the pulse timing of the WRITE gate to sector pulse timing.

As seen in FIG. 8, the cylinder address uses 1.5 bytes (12 bits) of data bits. The track address uses one byte of eight bits of data while the sector address uses eight bits (1 byte ) of data. The least significant bit (LSB) in the sector address (which is not contained in the field written on the disk platter) can be a 0 or 1 in order to select either the first or the second physical sector of data located by the single sector address SSSSSSSO.

Interface Card Unit

Figure 4B:
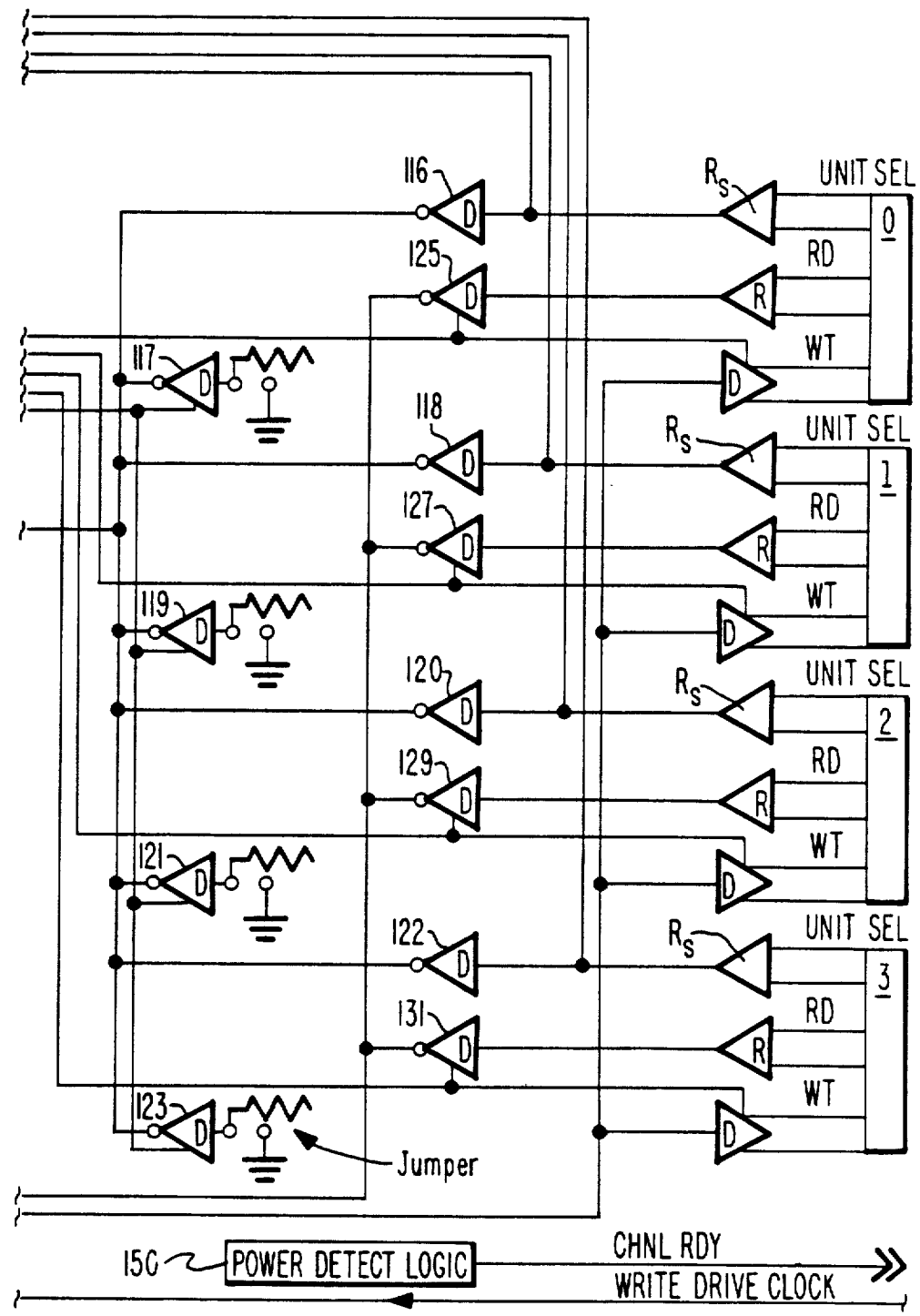
FIG. 4 is a block diagram of the interface card unit of the data link processor.

Referring to FIG. 4, there is seen the interface card unit 4. Each card unit $4_a$ and $4_b$ follows the pattern of FIG. 4.

Connections to four disk drive units ($D_0$, $D_1$, $D_2$, $D_3$) are shown with data transfer line connections for the Write operation (designated as WT) by passage through drivers D. Likewise, data transfer operations on a Read operation are effectuated through the receiver gates, designated R. Each one of the disk drive units also has unit select lines which pass through the receivers marked $R_S$.

The major purpose of the interface card 4 is to receive the unit select signal (USS) of a given disk drive unit for connection to the formatter card 3 so that appropriate data transfer operations, either Read or Write, can be effectuated.

The unit select signal can come from any one in a group of eight signal lines.

The unit select signal (USS) is originated from two sources:
(i) a disk drive unit;
(ii) a single one of a group of jumpers.

The unit select signal is transmitted via driver 105 (FIG. 3) to unit select logic in 115. The select logic in 115 then decides which "function" is requested, that is, if it is a Read unit type (jumpers) or Read unit type (disk drive).

The unit type function uses all of the eight USS lines (0–7) while the unit select function uses only a selected one line of the eight lines.

The jumper information tells the formatter unit 3 what "type" of disk drive is connected, that is, to say, what manufacturer type it is and thus its cylinder, track and sector capacity as seen, for example, in FIG. 7 which shows two types of Memorex disks, the 214 and the 226.

From the jumper identification, the formatter 3 can then address the attribute table 97, FIG. 3, to access specific information regarding the characteristics usable for that specific type of disk drive.

Thus, any data words received from a selected drive unit will be transferred through the receiver gate on the data line marked RD and passed onto the formatter 3, and into buffer $22_2$.

Similarly, Write data on data line WR can be received from buffer $22_2$ in the formatter 3 and passed onto the gate drivers D for transit to the selected drive unit.

Driver gates 117, 119, 121 and 123 are made to work in conjunction with jumpers to provide signals to the unit select line which goes to formatter 3. The jumpers operate to identify a disk drive unit as to its type.

Driver gates 116, 118, 120 and 122 are used to convey the unit select signals to the formatter 3. The unit select logic 115 also receives signals from the PROM 97 and the unit select gate $R_S$ in order to send a signal to the formatter 3 to indicate that only one unit has been selected.

The driver gates 125, 127, 129 and 131 are used to enable any Read operations on the RD data line. These gates are controlle d by 115.

The power detect logic unit 150 provides a channel ready signal to sense if there is a power supply problem in any of the selected disk units. If a power supply problem is detected in a disk module, then that particular disk interface will be shut off.

There is also a clock line from the disk drive to formatter 3 as indicated in FIG. 4. This line is called the WR drive clock line and is used to provide clock operations during the writing and reading of data of the disk that is selected.

The unit select logic 115 (FIG. 4) receives inputs from each disk drive module ($D_0$, $D_1$, $D_2$... $D_7$) and operates to scan these inputs to see whether only one disk module has responded (normal) or whether multiple numbers of disk modules have responded (error). If two or more disk modules have responded, then logic 115 will output an error signal to the formatter unit 3. The formatter will report the error (multiple response) to the host adapter unit 2 which will signal host computer 10. This will initiate a retry of the operator (OP) which caused the error signal.

The logic circuit 115 is a programmed array logic (PAL) unit of which a typical version is manufactured by Monolithic Memories Inc. of 2175 Mission College Blvd., Santa Clara, Calif. 95050. This unit is described as a 20×4 PAL in the 1983 publication entitled PAL-Programmable Logic Handbook - 3rd Edition and published by Monolithic Memories, Inc.

The power detect logic 150 of FIG. 4 is used to monitor the voltage levels of the host 10 (host adapter 2, formatter 3 and interfaces 4 ($4_a$, $4_b$). Should the power supply to any of these units fall below a specified voltage, then the power detect unit 150 will command a "turn-off" of the disk drive interface connections to the disk modules.

As is indicated in the patents incorporated by reference, the host system 10 sends the DLP an I/O descriptor (command) and a descriptor link which identifies that particular command cycle. The DLP performs the required operation and returns a result/descriptor (R/D) to the host to indicate the status of that command (complete, incomplete, error, etc.).

The result/descriptor fields provide all information needed by the host 10 for a "retry" in the event of unsuccessful completion of the I/O descriptor command.

A result/descriptor is used to immediately report (to host 10) any "exception" conditions such as:

(a) a vertical or a longitudinal parity error in the I/O descriptor or the descriptor link;

(b) an invalid unit number (for a peripheral) is detected;

(c) the command queue (in RAM 22) for the designated peripheral unit is already full;

(d) Read or Write errors.

The host does not disconnect (from DLP), process or send other command operators until the DLP accepts present OPs. A command operator having an error condition will not be executed or placed in the memory queue.

If there are deficiencies in the magnetic layer areas of a disk which will cause "media errors", this will be reflected in exception bits in the result descriptor words. These exception bits identify the location of the defective sector.

Error Recovery

The data link processor will do an automatic error recovery operation for:

(i) Seek errors—where difficulty occurs in locating the desired cylinder and track;

(ii) Read errors—due to a bad address or bad (incorrect) data.

On "seek errors" the DLP does a retry by repositioning to cylinder "0" and then retrying the seek to the desired cylinder and track.

On Read errors which may show up as "Bad Address" data (BA) or Bad Data (BD), the DLP will retry the Read for nine retries using track offsets which position the head at nominal center, then an inward offset and outward offset until a correct address and data is effected. If data is still incorrect, the formatter will attempt to correct the data by using the ECC as a pointer.

The DLP uses an operator called the Verify Data-/EPC OP. This command causes the DLP to check for Read errors. The DLP reads the sector specified by the logical address and continues reading until (i) a Read error or (ii) a media error or (iii) end of cylinder is encountered.

For each sector the DLP verifies its position relative to the index (FIG. 7), address and data EPC (error protection code) fields and data field.

The data field contents are compared to a 16-bit test pattern which was transferred to the DLP as WriteData. Thus, "correct" readout or "error" readout is spotted.

The storage module device-data link processor, as previously indicated, operates under host generated commands called I/O descriptors. A typical I/O descriptor format is shown in Table I as having five words. Each word has four area positions shown as 4-bit group A, group B, group C and D. The name and functions of each field are described in Table I, shown hereinbelow.

TABLE I

| Common I/O Descriptor Fields | | | | | | | | | | | | | | | |
|---|---|---|---|---|---|---|---|---|---|---|---|---|---|---|---|
| Bit Designations | A8 | A4 | A2 | A1 | B8 | B4 | B2 | B1 | C8 | C4 | C2 | C1 | D8 | D4 | D2 | D1 |
| I/O Descriptor Format: | | | | | | | | | | | | | | | | |
| Word 1: | | ←OP→ | | | | ←Sub-OP→ | | | | ←Unit→ | | | | ←Variant→ | | |
| Word 2: | 0 | 0 | 0 | 0 | 0 | 0 | 0 | 0 | ←Storage Address→ | | | | | | | |
| Word 3: | Storage Address→ | | | | | | | | | | | | | | | |
| Word 4: | 0 | 0 | 0 | 0 | 0 | 0 | 0 | 0 | ←Data Transfer Length | | | | | | | |
| Word 5: | Data Transfer Length→ | | | | | | | | | | | | | | | |
| OP Field | Specifies the nature of the data transfer that occurs as part of the successful execution of the operation. The legal codes are as follows: A8 A4 A2 A1 Definition | | | | | | | | | | | | | | | |

TABLE I-continued

Common I/O Descriptor Fields

|   |   |   |   |   |
|---|---|---|---|---|
| | 0 | 0 | 1 | 0 | TEST OP - no data transfer. |
| | 0 | 1 | 0 | 0 | WRITE OP - data transfer from host to DLP. |
| | 1 | 0 | 0 | 0 | READ OP - data transfer from DLP to host. |

| Field | Description |
|---|---|
| Sub-OP Field | Specifies the type of operation to be performed by the DLP. The actual values for each OP are shown in the section on individual OP types. |
| Unit Field | Designates the Unit within the subsystem to which the operation is directed. The range of values is 0 to 7. |
| Variant Field | Specifies options for a given Sub-OP. The DLP ignores any part of the variant which is not defined for a given OP. |
| Address Field | Specifies either the logical (sector) address or the physical (sector) address within the specified unit, depending on the OP. |
| Length Field | Specifies the length of the data to be transferred, in bytes, for a given OP. |

In order to select a particular disk drive module (designated 0 through 7), each command operator (OP) will designate the particular disk module to be used. The format OP (I/O descriptor) is used as seen typically in Table II. Basically three words will specify the drive unit number, the cylinder address, the head (track) address and the desired sector address. These are indicated in the locations shown in Table II hereinbelow.

The other method is the DLP self-test which is an inbuilt diagnostic routine which can diagnose any DLP malfunctions and isolate them to the failing circuit board or module on it.

The DLP self-test does not test the disk drive peripherals nor the DLP interface to the host computer 10. The self-test operates to test the hardware of the logic modules of the DLP. Table III indicates a self-test initi-

TABLE II

Format OP (I/O Descriptor)

| Bit Designations | A8 | A4 | A2 | A1 | B8 | B4 | B2 | B1 | C8 | C4 | C2 | C1 | D8 | D4 | D2 | D1 |
|---|---|---|---|---|---|---|---|---|---|---|---|---|---|---|---|---|
| I/O Descriptor Format: | | | | | | | | | | | | | | | | |
| Word 1: | 0 | 0 | 1 | 0 | 1 | 1 | 0 | 1 | 0 | UN | UN | UN | 0 | 0 | 0 | 0 |
| Word 2: | 0 | 0 | 0 | 0 | 0 | 0 | CA | CA | CA | CA | CA | CA | CA | CA | CA | CA |
| Word 3: | 0 | 0 | HA | HA | HA | HA | HA | HA | 0 | SA | SA | SA | SA | SA | SA | SA |

Word 1 I/O Descriptor Abbreviations:
UN - Drive Unit Number (0–7 hex)
Word 2 I/O Descriptor Abbreviations:
CA - Cylinder Address
Word 3 I/O Descriptor Abbreviations:
HA - Head Address       SA - Sector Address There are several maintenance techniques for testing the data link processor. One method is by the host computer to run maintenance and confidence tests by its master control program (NCP) which can detect and isolate one particular unit of the system.

ate OP using one word (16 bit) and the result/descriptor format of four words which are returned to the host 10 for information.

TABLE III

Self Test Initiate OP

| Bit Designations | A8 | A4 | A2 | A1 | B8 | B4 | B2 | B1 | C8 | C4 | C2 | C1 | D8 | D4 | D2 | D1 |
|---|---|---|---|---|---|---|---|---|---|---|---|---|---|---|---|---|
| I/O Descriptor Format: | | | | | | | | | | | | | | | | |
| Word 1: | 0 | 0 | 1 | 0 | 1 | 0 | 1 | 1 | 0 | 0 | 0 | 0 | 0 | 0 | 0 | 0 |
| Result Descriptor Format: | | | | | | | | | | | | | | | | |
| Word 1: | 0 | UI | VP | LP | 0 | 0 | 0 | ID | 0 | 0 | 0 | 0 | 0 | 0 | 0 | Ex |
| Word 2: | 0 | 0 | 0 | 0 | 0 | 0 | 0 | 0 | 0 | 0 | 0 | 0 | 0 | 0 | 0 | 0 |
| Word 3: | 0 | 0 | 0 | 0 | 0 | 0 | 0 | 0 | 0 | 0 | 0 | 0 | 0 | 0 | 0 | 0 |
| Word 4: | 0 | 0 | 0 | 0 | 0 | 0 | 0 | 0 | 0 | 0 | 0 | 0 | 0 | 0 | 0 | 0 |

Word 1 Result Descriptor Abbreviations:

A8 - 0 - Not used                    C8 - 0 - Not Used
A4 - UI - Unable to Initiate         C4 - 0 - Not Used
A2 - VP - MLI Vert. Parity Error     C2 - 0 - Not Used
A1 - LP - MLI Long. Parity Error     C1 - 0 - Not Used
B8 - 0 - Not Used                    D8 - 0 - Not Used
B4 - 0 - Not Used                    D4 - 0 - Not Used
B2 - 0 - Not Used                    D2 - 0 - Not Used
B1 - ID - Invalid I/O Descriptor     D1 - Ex - Exception Self-Test Initiation: The following four methods are provided by the SMD DLP to initiate a self-test. These methods are compatible with DLPs in any base.

1. An automatic self-test is performed when the base is powered on. This is a complete hardware test.
2. A self-test is initiated manually by a push button. This is a complete hardware test.
3. A self-test is initiated by a test operation on the DLI test bus. This operation can be initiated by the maintenance card or by system hardware that has access to the DLI. This can initiate a complete self-test or a subset of the self-test.
4. A self-test of the DLP may be performed by sending a host-initiated I/O descriptor to the DLP. This descriptor is sent by a maintenance program such as PTD (peripheral test driver routine). In addition, tests of subsystems or modules may also be performed by I/O descriptor.

The DLP begins its self-test upon receipt of any of three "clear signals": a foreplane clear, which is generated by a pushbutton switch located on both the host adapter card and the formatter card, a powerup clear, and an initiation signal from the test bus.

After initiation of the self-test, the DLP disables its peripheral and DLI interfaces. If the DLP is addressed when executing its self-test, it appears at status zero (non-present DLP). The DLP remains at status zero until successful completion of its self-test.

Manual Self-Test Initiation: The host adapter card 2 and formatter card 3 each contain a pushbutton switch and an LED used for the manual self-test initiation and self-test result reporting.

Self-Test Initiation While MCP is Executing: (MCP=master control program in host 10)

If the self-test is initiated while the MCP is executing, all paths from all hosts to DLP(s) on which self-tests are to be initiated must be reserved prior to the self-test. This is required to ensure the integrity of the base and MCP during self-test.

While the self-test is executing, DLI state is not disturbed. If the DLP is addressed while self-test is executing, a status of zero is seen by the host due to the status lines being disabled.

Self-Test Initiation by I/O Descriptor: Initiation of self-test by I/O descriptor is done using PTD (peripheral test driver routine). The initiation of self-test by I/O descriptor does not provide the single module failure resolution that self-test initiated on the test bus lines does. This lower level of resolution when initiating tests by I/O descriptor is due to the requirement that the HDP, MLI, connection modules, and DLI must be functional to access the DLP.

The HDP is the host dependent port of the host system 10 in FIG. 1 while MLI refers to the message level interface and DLI refers to the data link interface (FIG. 1).

The self-test status I/O informs the host if the formatter card fails, but the host adapter card passes the self-test.

In order to prevent useless and time-wasting operations in a peripheral-controller, it is advantageous to check the operational integrity of the hardware before actual execution of operators.

The presently described data link processor (peripheral-controller) includes a host adapter card and formatter card which undergoes a self-test upon power-on, or by a manual pushbutton on each card, or by a host initiated self-test command (I/O descriptor).

Upon power-up, or manual self-test, a host control store (30) will be sequenced to probe test the hardware in host adapter card 2, FIG. 2, after which sequencer (26) will receive signals which indicate proper function or misfunction. Sequencer (26), upon misfunction signals, will cause a control store 30 to light up (via circuit 34, FIG. 2) a light emitting diode, $20_d$, which will continue to be lit if the host adapter card 2 does not operate properly.

Likewise, formatter card unit 3, FIG. 3, will have its control store (90) sequenced by sequencer (88) to probe test the hardware components after which sequencer 88 will receive signals to indicate proper function or misfunction of card unit 3. If misfunction occurs, the sequencer 88 will cause control store 90, FIG. 3, to light up the light emitting diode $20_f$ via bus control 76. If no misfunction occurs during self-test, then control store 90 will disable (turn-off) the LED $20_f$ via bus control 76.

The host and peripheral connections to the DLP (data link processor) are disabled during the self-test operation.

Another self-test operation can be initiated by the host 10 via an I/O command descriptor to initiate the self-test routines.

Here the host 10 is connected to the DLP and transmits a self-test initiate command which is verified by a result/descriptor word to the host 10. Then the host disconnects from the DLP while the self-test operations continue in the host adapter card 2 and the formatter card 3. If no misfunction is sensed, the DLP will reconnect to the host for further operation. If a misfunction is sensed, the DLP will not reconnect to the host and the misfunctioning card unit will maintain the "lighted" condition of its light-emitting diode.

Self-Test Result Reporting: The SMD DLP provides the following methods to report the result of the self-test. All methods are compatible with any I/O base module which can house a multiple number of data link processors.

1. The result is displayed on LEDs which are visible outside of card air shields.
2. The result is returned on the test bus lines.
3. The self-test status I/O descriptor returns the result of the self-test.

The result bits have the same format and information for all methods in obtaining the result of self-test. The LEDs, display bits (DPLY01-02) and self-test status result/descriptor word two bits have identical meanings. When the DLP is either in the process of self-test, has failed the self-test, or has detected an on-line failure, the LEDs are on, the test bus display lines are active LOW and the self-test status result/descriptor word 2 bits are TRUE. The primary bit, top LED, and DPLY01 display the status of the self-test in relation to the main logic board. If the LED is on after the specified time for execution of the self-test, it indicates that the board failed. If both the primary bit and other bits are TRUE after the specified time for the test, it indicates that no other boards were tested and that the main logic board has failed its self-test or that the connection to the main board is bad.

When the test is initiated, the primary bit is set to TRUE, the LEDs are turned on, DPLY01 is HIGH, and D1 is TRUE. If the test completes successfully, the result bits are all FALSE. If the bit for the primary board is FALSE, and one or more bits remain TRUE, the bit(s) which is TRUE indicates which module is failing. The maintenance flow for the individual system can be followed to determine the order of module replacement.

The self-test status operation states the correspondence between result bits and boards, or modules, contained in the DLP.

Host-initiated self-test results may be obtained for maintenance purposes using the self-test status operation. This is accomplished by using a program such as PTD (peripheral test driver). If the DLP is not sufficiently operational to return a result, a status of zero is presented when connection is attempted. A status of zero is interpreted as a non-present DLP by the host.

When the DLP is addressed by host 10, then a line designated LCPON/0 is active; therefore it is possible to differentiate between a "non-present" DLP, and one that is in the process of self-test or has failed self-test. (When non-present DLPs of either type are addressed, LCPON/0 is not active). The LCPON/ signal is used to indicate whether the host is connected or not connected to the DLP.

Systems Operation

Referring to FIG. 1 and FIG. 2, the host adapter card 2 receives requests for disk operations from the host system 10 by means of the ML1 DL1 (message level interface-data link interface). Thus, the request data (I/O command) comes through transceiver 20 and is put into RAM buffer 22. Here the OP register 46 and OP decoder 48 are used to check out the validity of the requested operator OP. The parity check generator 56 will check parity and set the parity error flag 58 should the parity be improper. The parity error flag 58 will then be checked by control store 30.

The host adapter 2 makes a further check of the command request operator by using the arithmetic logic 42 and the D latch 44 to generate a longitudinal parity word as a further check upon the command request operator from the host.

At this stage of the sequence, the host adapter 2 notifies the formatter 3 that an operator (OP) is pending. Here the operator is placed from the queue (FIG. 6) into one of the device control blocks (DCB$_0$ through DCB$_7$). Further, there is a bit set in the DCB activity map (address FAO in FIG. 6).

A "wake-up" address is developed in the peripheral address counter 64 (FIG. 2) and passed on through gate 68 into the for atter 3 by control store 30, the microcode passing along line S$_x$ on to sequencer 36 and thence to the peripheral control store 38 which will cause a Write command to be issued at the wake-up address in counter 64.

The formatter 3 will read the activity map FIG. 6) Of RAM buffer 22 at the address FAO and will use this information in order to read out the proper block (DCB0-DCB7) of the device control block of the memory 22,. FIG. 6.

The formatter 3 reads the appropriate operator (OP) from the RAM buffer 22 and sets up an active flag in the command descriptor section (CMND DESC) of the flags shown as an extension of block 3 (DCB3) of the memory map of FIG. 6.

The host adapter card 2 controls the transfer of data between the host system 10 and the buffer memory 22 (FIG. 6). This is done through the control store 30 (FIG. 2), whereby a result descriptor (R/D) is formed in the "RSLT DESC" section of FIG. 6 (shown as an extension of a typical data control block). A flag is set in the interrupt message. Thus, at the end of the input/output operation, the host adapter 2 assembles the result-/descriptor words in the buffer RAM 22 (FIG. 6).

The control store 30 of FIG. 2 is basically connected to all of the other elements of the host adapter system 2 and it sends out control signals and receives back information by which it can decide on the next appropriate routine to be executed.

The formatter unit 3 shown in FIG. 3 provides the logical interface between the storage module device disk drive and the host adapter card by means of the M bus.

Thus, the formatter 3 provides a bus for address data (ADRxx), a bus for data words being transferred (DATAxx) and a bus for control signals. Subsequently the host adapter card 2 then interfaces the host system 10 via the interface bus designated MLI/DLI (FIG. 1).

The formatter 3 generates (a) drive control signals via the control store 90 and the micro-decoder 99 which are passed on through registers 106, 108 and driver gates 107 and 109 on to the interface cable to the disk drive and the formatter further generates (b) data signals as follows: (i) on Write operations, the data from the host 10 and host adapter card 2 will go into the formatter RAM buffer 22$_2$ and thence on to the FIFO 100 for conversion from parallel to serial format; and thence through gate 104 and flip-flop 110; then through driver gate 111 on to the interface card 4; and (ii) on Read operations, the data from the selected disk drive comes through the interface 4 on to the Read data line through receiver gate 112, thence through gate 113, the shift register 101 to the FIFO 100 for conversion into parallel data and thence is transmitted to the formatter RAM 22$_2$. Then the data words are transferred to the M data bus through transceiver 70 and into the buffer RAM 22 of the host adapter card 2 for subsequent transmission to the host system 10.

As seen in FIG. 3, the formatter 3 receives all of the mentioned drive "status" signals from the disk drive and the "data" signals (from Read and Write operations) via the interface board 4.

Read: During the disk Read operations, the formatter 3 will accept:

(a) serial data from the selected disk via the gates 125, 127, 129, 131 (FIG. 4) according to which particular drive unit has been selected;

(b) the formatter interprets the synchronization bit patterns by means of shift register unit 101;

(c) the formatter verifies data validity through the use of the cyclic redundancy checker (CRC) and the error correction code (ECC) unit 103 of FIG. 3;

(d) the formatter does serial-parallel or parallel-serial conversion through use of the FIFO register 100;

(e) the formatter passes the parallel organized data into the host adapter buffer, RAM 22, in addition to passing any data on error conditions which were detected.

Write: During the Write disk operations (OP), the formatter 3 then:

(a) performs parallel-serial conversion using the FIFO 100. Thus, data is transferred from the RAM 22$_2$ of the formatter 3 over to the FIFO 100, thence to the gate 104 and flip-flop 110 through driver 111 over to the interface 4 for transmission to the disk drive;

(b) transmits serial Write data over to the data driver using driver 111 over to the interface 4 and thence to the selected disk;

(c) the formatter 3 receives a "Write drive clock" signal from the disk drive to synchronize the serial data with the disk rotation.

The formatter 3 (FIG. 3) is provided with logic for the error recovery procedure. This is handled by the ECC unit 103. This unit will match the error correction code which comes from the disk drive unit and pass the information to the control store 90 of the formatter 3 so that corrective action may be instituted. A result descriptor is then passed on to the host adapter informing it as to the action that has taken place.

INTERFACE CARD

As seen in FIG. 4, the interface card unit 4 provides connection for data transfers between the formatter card unit 3 and the disk drive. This is basically done with the B cable shown in FIG. 5.

The interface card 4 has drivers and receivers shown in FIG. 4 and marked as either a D for driver or a R for receiver. Each disk drive unit is connected to two receivers and one driver. The two receivers are for drive unit selection (Rs) and for Read operations (R) while the one driver D is for Write operations.

As seen in FIG. 4, there are jumper switches which are attached to the drivers 117, 119, 121 and 123. These can be used as unit identification switches for each one of the four drive units connected to these drivers.

In FIG. 4 of the interface card unit 4 the unit selection logic 115 is used to detect an error condition when signals indicate that multiple units have been selected. This constitutes an error condition since only one unit can properly be selected at any given time. When a multiple unit selection signal is received, then corrective action must be initiated in order to identify and select the intended disk drive unit.

When the multiple unit selected-error signal occurs, it will inhibit or shut down the unit select mechanism through the programmed logic of 115.

As previously mentioned, the power detect logic 150 in FIG. 4 is used to turn off the disk drive interface whenever there is detected a power fault in any one of the data link processor card units 2, 3 or 4, or in system power.

As seen in FIG. 5 the A cable goes directly from the formatter unit 3 over to each of the disk drive units from $D_0$ over to $D_7$ on a daisy chain basis.

The interface unit 4 can be made by use of two interface cards $4a$ and $4b$. Card $4_a$ provides cables $B_x$ to four drive modules $D_0$–$D_3$ while card $4_b$ provides cables to four modules $D_4$–$D_7$.

The unit select logic 115 (FIG. 4), upon receiving a "unit select" signal (as, for example, from unit 2 via its receiver $R_s$ to logic 115), will select the interface card $4_a$ of FIG. 5. However, should logic 115 receive two or more "unit select" signals, it will shut down the communication lines to the disk drive units by "disabling" drivers 125, 127, 129, 131.

In regard to the formatting of addresses for the selection of a specific disk drive and a specific cylinder and head area, the host system 10 will provide a binary (FIG. 8) address into the data buffer RAM 22. This data will be placed in the data control block DCB (FIG. 6) and passed on to the formatter data buffer RAM $22_2$.

This information is then translated into cylinder data, head data and sector data which is transmitted on the A cable directly to the selected disk drive unit.

The cylinder data, head data and sector data resides in the formatter data buffer RAM $22_2$ before being passed on to the selected disk drive.

Referring to the Read data line "RD data" shown in FIG. 3, the data words come from the disk through the interface 4 and over to the receiver 112. Thence it is passed on through gate 113 and shift register 101 over to the FIFO register 100, as well as gate 102 to 103 to generate an ECC for the incoming data.

A comparison occurs at this stage of the sequence by use of the arithmetic logic unit 80 which compares the generated ECC word and the ECC Read from the disk so that it can give an "OK" (enable signal) to the control store 90 to continue with transferring data words from the disk drive into the formatter data RAM $22_2$ and thence over the data bus to the host access data RAM 22 and thence on the data bus to the host system 10.

While the described system of data link processors using disk peripherals has been described in its preferred embodiment, other variations and embodiments may be effectuated but which still are encompassed by the concepts as defined in the attached claims.

What is claimed is:

1. In a data transfer network wherein a host computer means uses a plurality of peripheral-controllers for accessing selected disk drive units in a group or peripherals having a plurality of disk drive units, which have different operating parameters from each other, the network for effectuating rapid Read/Write operations between said host computer and selected disk drive units comprising, in combination:
   (a) said host computer means for selectively transferring I/O commands to a first and second peripheral-controller means and for selectively sending data to or receiving data from a selected disk drive unit via said first and second peripheral-controller means; said host computer means including:
      (a1) means for testing the operability of said first and second peripheral-controller means;
      (a2) means for selecting and using the operable one of said first and second peripheral-controller means should one of said peripheral controller means be tested as being inoperable;
   (b) said first and second peripheral-controller means for selectively communicating with said main host computer and connected to respective first and second communication ports on each said disk drive unit; and wherein each of said peripheral controllers includes:
      (b1) means for storing particular operating parameters for each disk drive unit;
      (b2) means for executing data transfers to/from a particular disk drive unit through usage of the particular operating parameters;
   (c1) said group of peripherals consisting of a plurality of disk drive units wherein each disk drive unit includes:
   (c) said first communication port connected to said first peripheral-controller;
   (c2) said second communication port connected to said second peripheral-controller.

2. The network of claim 1 wherein each of said first and second peripheral-controllers includes:
   (a) host adapter unit means to receive and store I/O commands from said host computer for later transfer to a formatter unit;

(b) said formatter unit receiving a selected I/O command from said host adapter unit means and generating an isntruction format for accessing a selected disk track/sector for Read/Write operations via a disk interface control means;

(c) said disk interface control means, connected to said formatter unit, for enabling the selection of a disk drive unit and subsequent data transfers between said selected disk drive unit and said host adapter unit means via said formatter unit, said disk interface control means including:

(c1) connection means to enable connection between said first or second port of each of said disk drive units and said formatter unit.

3. The network of claim 1 wherein each of said first and second peripheral-controller means includes:

(a) first control means for receiving and storing a group of "A" I/O commands, wherein each I/O command indentifies a specific disk drive unit, and where "X" represents the number of disk drive units serviced by said peripheral-controller means, and including:

(a1) means for connecting to and disconnecting from said host computer via software in a first host sequencer means which responds to said I/O commands and to a second peripheral sequencer means;

(a2) a first buffer memory means for storage of said I/O commands in a command queue and for storage of blocks of data words being transferred between said host computer means and a second buffer memory means;

(a3) said first host sequencere means for executing data word transfers between said host computer means and said first buffer memory means and also for executing data word transfers between said first and second buffer memory means;

(a4) said second peripheral sequencer means for synchornizing data word transfers between said first host sequencer means and a third sequencer means;

(b) second control means for receiving control data and address data for selection of a specific cylinder, track and sector on a selected one of said plurality of disk drive units, and including:

(b1) said second buffer memory means for storing data words received from said host computer or from a selected disk drive unit;

(b2) said third sequencer means for executing data word transfers from/to said second buffer memory means and said first buffer memory means, and for executing data word transfers between said second buffer memory means and a selected disk drive unit;

(b3) means for communicating with a disk unit interface control means, said communicating means including:

(b3a) Read data means for receiving data words from said selected disk unit into a conversion means for storage into said second buffer memory means;

(b3b) write data means for receiving data words from said conversion means for synchronized transmittal to said disk unit interface control means;

(b3c) said conversion for executing serial-to-parallel and parallel-to-serial conversion of data words;

(b3d) register-driver means for transmitting control signals to said disk unit interface control means;

(b3e) disk drive unit select signal means for enabling connection to said selected disk drive unit exclusive of other disk drive units;

(c) said disk unit interface control means for enabling connection of a selected disk drive unit to said second control means, said disk interface control means including:

(c1) select logic means; connected to each of said disk drive units, for enabling connection of only said selected disk drive unit to said second control means when said select logic means receives more than one disk drive select signal, said logic means including:

(c1A) means for generating a disk drive select signal to said second control means, in response to instructions in said I/O command.

4. The network of claim 3 wherein said first buffer memory means includes:

(a) a queue storage area for storing up to "X" sets of I/O commands, one for each of "X" disk drive units;

(b) a data word block storage area for temporarily storing at least "2X-2" blocks of data words being transferred between said host computer and a selected disk drive unit;

(c) a device control storage area for temporarily storing parameter data for addressing a desired track/sector for each specific disk drive unit.

5. The network of claim 4 wherein each peripheral-controller, means includes:

(a) means for immediately executing an I/O command from said host computer even while said queue storage area is fully loaded with I/O commands.

6. The network of claim 5 wherein said means for immediately executing includes:

(a) a scratch queue area in said first buffer memory means for storing an immediate I/O command which is granted first priority in execution.

7. The network of claim 3, wherein said second control means includes:

(a) attribute table memory means for storage of data on specific operating characteristics and parameters of each of said disk drive units, said data being addressable by said third sequencer means;

(b) sector format circuit means, addressable by said third sequencer means, to provide appropriate protocol and pattern timing to said third sequencer means for each data transfer operation to/from any selected disk drive unit.

8. The system of claim 3, wherein said second control means further includes:

(a) means for verifying the accuracy of data read and received from a selected disk drive module during a Read operation, and, (b) means for transmitting an error signal to said first buffer memory means when the accuracy of received data is not verified.

9. In a data transfer network wherein a first host computer means and first group of dual-ported disk drive units is cross coupled to a second host computer means and second group of dual-ported drive units whereby either one of said first or second host computer means can service a disk drive unit in either one of said first group or said seocnd group of disk drive units, the combination comprising:
  (a) a first host computer means for accessing each one of a first group of disk drive units for executing Read/Write operations between a selected disk drive unit and said first host computer;
  (b) a second host computer means for accessing each one of a second group of disk drive units for executing Read/Write operations between a selected disk drive unit and said second host computer;
  (c) a first group of a plurality of disk drive units connected to said first computer means via a first peripheral-controller means, said first group of disk drive units including a disk drive units having different protocols and operating parameters from each other;
  (d) a second group of a plurality of disk drive units connected to said second computer means via a second peripheral-controller means said second group of disk drive units including disk drive units which have different protocols and operating parameters from each other;
  (e) a first and second peripheral-controller means respectively connecting said first and second host computer means to said first and second group of disk drive units, and wherein each said peripheral-controller means includes:
    (e1) a master data link processor for accessing a designated disk drive unit which holds a master control program for use in Read/Write operations on disk drive units by a slave data link processor, said master data link processor being initiated by said host computer means;
    (e2) said slave data link processor connected to said master data link processor via said host computer means and functioning to execute Read/Write operations on selected disk drive units;
  (f) first and second auxiliary disk drive interface means, respectively connected to each of said slave data link processors, for enabling said first computer means to access said second group of disk drive units and for enabling said second computer means to access said first group of disk drive units.

10. The combination of claim 9 wherein each of said first and second peripheral-controller means includes:
  (a) host interface control means for receiving and storing I/O commands from said host computer and transmitting a selected one of said I/O commands to a formatter control means; said I/O command including a particularly addressed disk drive unit and Read or Write instructions; said host interface control means including:
    (a1) means to transfer information data between said host computer and said formatter control means;
  (b) said formatter control means for receiving said selected one of said I/O commands and for accessing a parameter table means for holding operating parameters which specify the available sector numbers (beginning and ending addresses), number of heads per drive, and number of bytes per track for the elected addressed disk drive unit, said formatter control means including:
    (b1) said parameter table means including an attribute table and format circuitry for storing said operating parameters and format protocol characteristics for each one of said plurality of disk drive units;
    (b2) means to transfer said information data between said host interface control means and a disk drive interface control means according to said operating parameters and format protocol characteristics derived from said attribute table;
  (c) said disk drive interface control means for establishing the identity of the selected disk drive unit and for executing Read/Write data transfers between said selected disk drive unit and said formatter control means.

11. The combination of claim 10 wherein said disk drive interace control means includes:
  (a) means to exclude all but the elected disk drive unit from communicating to said formatter control means for a given period of time.

12. The combination of claim 10 wherein said disk drive interface control means includes:
  (a) means to detect any power fault in either in said host interface control means or said formatter control means, and in response thereto, to shut off connection to said disk drive interface control means.

13. In a data transfer network wherein a host computer means uses first and second peripheral-controller means for accessing selected disk drive units in a group having a plurality of disk drive units which have different operating parameters from each other, the system for effectuating rapid Read/Write operations between said host computer means and selected disk drive units comprising, in combination:
  (a) said host computer means for selectively transferring I/O commands to said first and second peripheral-controller means and for selectively sending data to or receiving data from a selected disk drive unit via said first and second peripheral-controller means; said host computer means including:
    (a1) means to select said first or second peripheral-controller means for communication to any selected one of said disk drive units;
    (a2) means to select, during failure of one of said peripheral-controller means, the other peripheral-controller means;
  (b) said group of disk drive units consisting of a plurality of disk drive units wherein each disk drive unit includes:
    (b1) a first communication port connected to said first peripheral-controller means;
    (b2) a second communication port connected to said second peripheral-controller means;
  (c) first and second peripheral-controller means for selectively communicating with said host computer means and connected to said respective first and second communication ports on each said disk drive unit, and wherein each of said peripheral-controller means includes:
    (c1) host adapter control means for receiving and storing I/O commands from said host computer and transmitting a selected I/O command to a formatter control means;
    (c2) said formatter control means for receiving said selected I/O command and for formatting address data and Read/Write control data, by use of an attribute table and sector format means, to a disk drive interface control means, and including:
      (c2a) said attribute table providing appropriate disk module parameter data for each one of said disk drive units, wherein said disk module parameter data includes the appropriate beginning and ending sector addresses, number of heads per disk drive module and number of bytes per track;

(c2b) said sector format means providing pattern timing data to format a data record tailored to each specific one of said disk drive units;

(c2c) means to select said appropriate disk module parameters and pattern timing data to execute data transfers between said selected disk drive unit and said host computer means;

(c3) said disk drive interface control means for transmitting said address data and Read/Write control data to a selected disk drive unit and for enabling data transfers between said selected disk drive unit and said formatter control means; and wherein, (c3a) said disk drive interface control means of said first peripheral-controller means is connected to said first communication port of each of said disk drive units, and (c3b) said disk drive interface control means of said second peripheral-controller means is connected to said second communication port of each of said disk drive units.

* * * * *